(12) United States Patent
Mizuno

(10) Patent No.: US 12,715,112 B2
(45) Date of Patent: Aug. 25, 2026

(54) CONTINUUM ROBOT AND CONTROL METHOD FOR CONTINUUM ROBOT, AND RECORDING MEDIUM

(71) Applicant: CANON KABUSHIKI KAISHA, Tokyo (JP)

(72) Inventor: Tomohiro Mizuno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 18/824,364

(22) Filed: Sep. 4, 2024

(65) Prior Publication Data

US 2024/0424668 A1 Dec. 26, 2024

Related U.S. Application Data

(63) Continuation of application No. PCT/JP2023/004494, filed on Feb. 10, 2023.

(30) Foreign Application Priority Data

Mar. 7, 2022 (JP) ................................ 2022-034500

(51) Int. Cl.
*B25J 9/06* (2006.01)
*B25J 13/08* (2006.01)

(52) U.S. Cl.
CPC ............ *B25J 9/065* (2013.01); *B25J 13/088* (2013.01)

(58) Field of Classification Search
None
See application file for complete search history.

(56) References Cited

U.S. PATENT DOCUMENTS

2011/0319714 A1* 12/2011 Roelle .................. A61B 1/0051 600/118
2014/0343568 A1* 11/2014 Fenech .................. A61B 34/30 606/130

(Continued)

FOREIGN PATENT DOCUMENTS

JP 4758646 B2 8/2011
JP 6667691 B2 3/2020
JP 2022008179 A 1/2022

OTHER PUBLICATIONS

T. Kato, I. Okumura, H. Kose, K. Takagi and N. Hata, "Extended kinematic mapping of tendon-driven continuum robot for neuroendoscopy," 2014 IEEE/RSJ International Conference on Intelligent Robots and Systems, Chicago, IL, USA, 2014, pp. 1997-2002 (Year: 2014).*

(Continued)

*Primary Examiner* — Khoi H Tran
*Assistant Examiner* — Dairon Estevez
(74) *Attorney, Agent, or Firm* — Canon U.S.A., Inc. IP Division

(57) ABSTRACT

A continuum robot includes a forward and backward movement unit configured to cause a plurality of bendable portions to perform forward movement or backward movement in a lengthwise direction, an attitude change unit configured to cause each of the bendable portions to bend to change an attitude, an attitude memory configured to store the attitude with regard to each of the bendable portions, and a control switching unit configured to perform, when the forward movement or the backward movement is detected, in a case where an attitude of at least one bendable portion deviates to a predetermined extent or beyond from an attitude of the at least one bendable portion which is stored in the attitude memory, switching as change control of the attitude for the attitude change unit from position control for changing the (Continued)

attitude into a specified attitude to control for changing the attitude following an external force.

11 Claims, 17 Drawing Sheets

(56) References Cited

U.S. PATENT DOCUMENTS

| | | | | |
|---|---|---|---|---|
| 2018/0099422 | A1* | 4/2018 | Yoon | B25J 13/088 |
| 2019/0231449 | A1* | 8/2019 | Diolaiti | A61B 1/0016 |
| 2019/0321976 | A1* | 10/2019 | Takagi | B25J 18/06 |
| 2020/0370997 | A1* | 11/2020 | Palmer | G01M 15/14 |
| 2020/0375682 | A1 | 12/2020 | Kincaid et al. | |
| 2023/0241786 | A1* | 8/2023 | Fuke | B25J 9/1607 700/246 |

OTHER PUBLICATIONS

Y. Chen, J. Liang and I. W. Hunter, "Modular continuum robotic endoscope design and path planning," 2014 IEEE International Conference on Robotics and Automation (ICRA), Hong Kong, China, 2014, pp. 5393-5400 (Year: 2014).*

International Search Report and Written Opinion for PCT/JP2023/004494, mailed Apr. 25, 2023, originally published in Japanese, and an English translation of International Search Report and Machine Translation into English of Written Opinion obtained from WIPO using WIPO Translate are included herewith.

* cited by examiner

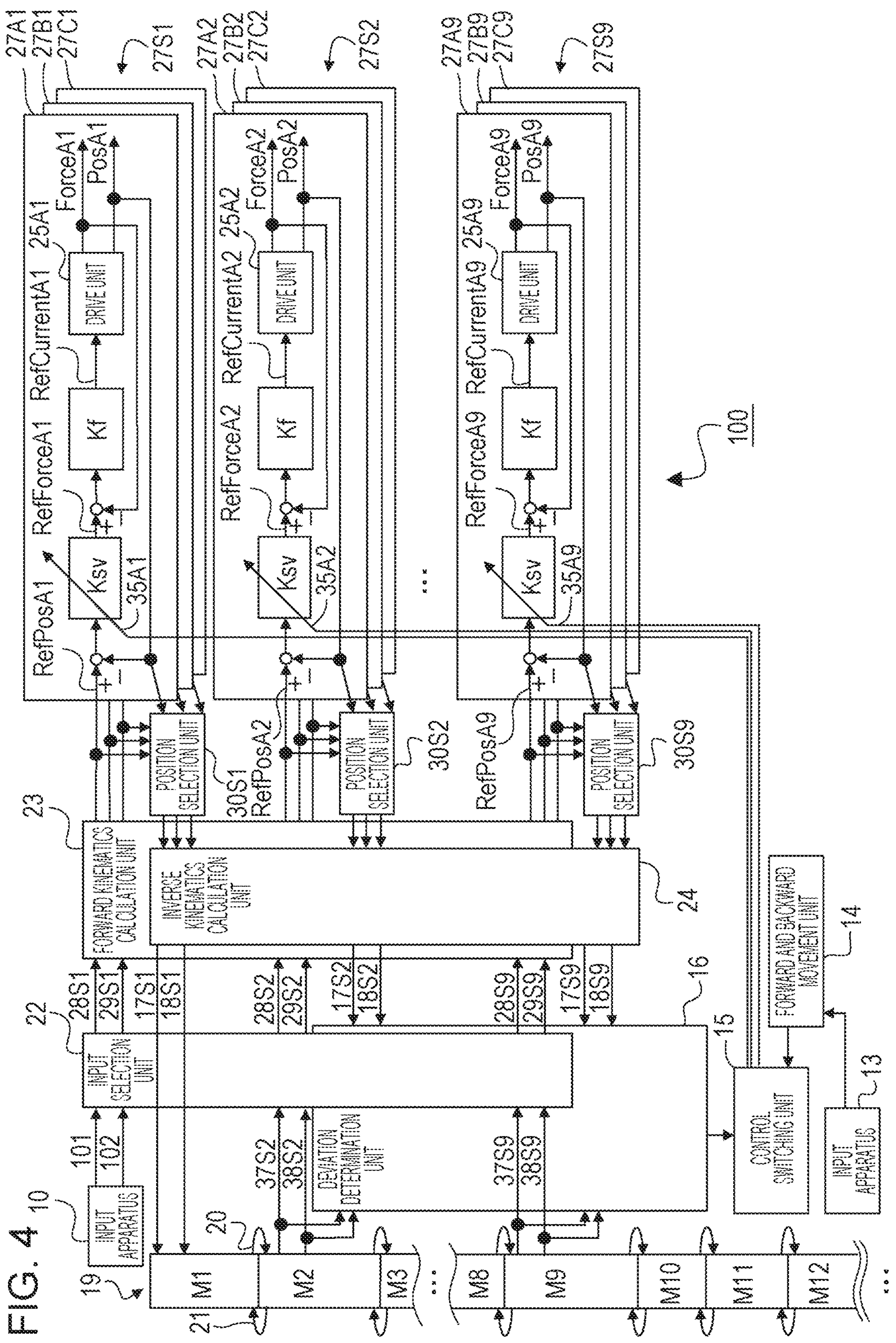
FIG. 4
100
10
INPUT APPARATUS
101
102
22
INPUT SELECTION UNIT
23
FORWARD KINEMATICS CALCULATION UNIT
24
INVERSE KINEMATICS CALCULATION UNIT
16
DEVIATION DETERMINATION UNIT
15
CONTROL SWITCHING UNIT
14
FORWARD AND BACKWARD MOVEMENT UNIT
13
INPUT APPARATUS
19
20
21
M1
M2
M3
M8
M9
M10
M11
M12
28S1
29S1
17S1
18S1
28S2
29S2
17S2
18S2
28S9
29S9
17S9
18S9
37S2
38S2
37S9
38S9
POSITION SELECTION UNIT
30S1
30S2
30S9
RefPosA1
RefPosA2
RefPosA9
Ksv
35A1
35A2
35A9
RefForceA1
RefForceA2
RefForceA9
Kf
RefCurrentA1
RefCurrentA2
RefCurrentA9
DRIVE UNIT
25A1
25A2
25A9
ForceA1
PosA1
ForceA2
PosA2
ForceA9
PosA9
27A1
27B1
27C1
27S1
27A2
27B2
27C2
27S2
27A9
27B9
27C9
27S9

27S1
27S2
27S9
23
FORWARD KINEMATICS CALCULATION UNIT
501S1
502S1
28S1
29S1
28S2
29S2
28S9
29S9
1/Z
1/Z
1/Z
22
503
504
10
INPUT APPARATUS
101
102
37S1
38S1
37S2
38S2
37S9
38S9
19
M1
M2
M3
M8
M9
M10

27S1
27S2
27S9
23
FORWARD KINEMATICS CALCULATION UNIT
INVERSE KINEMATICS CALCULATION UNIT
24
28S1
29S1
28S2
29S2
28S9
29S9
22
INPUT SELECTION UNIT
37S2
38S2
37S9
38S9
600S2
600S9
10
INPUT APPARATUS
SMOOTHING UNIT
SMOOTHING UNIT
19
20
21
M1
M2
M3
M4
M5
M6
M7
M8
M10
M90
M91
M92
M93
M94
M95
M96
M97

(a)
(b)
(c)
(d)
(e)
(f)
(g)
701
26S1
26S2
26S3
100
702
703
707
706
26S3
704S1
704S2
704S3
705
705
705
BACKWARD MOVEMENT
BACKWARD MOVEMENT
BACKWARD MOVEMENT
BACKWARD MOVEMENT

FIG. 12

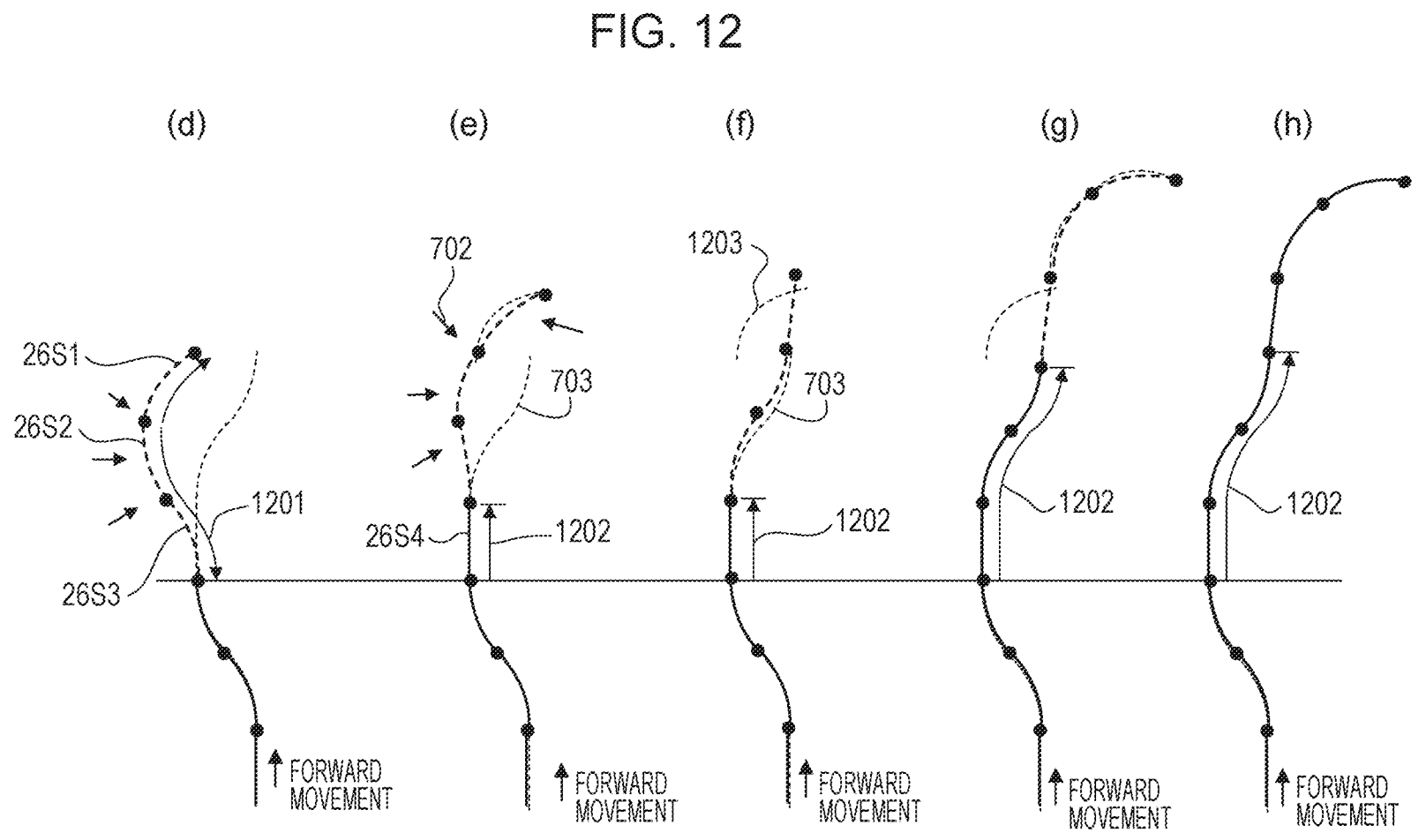

(d)
26S1
26S2
26S3
1201
FORWARD MOVEMENT (e)
702
703
26S4
1202
FORWARD MOVEMENT (f)
1203
703
1202
FORWARD MOVEMENT (g)
1202
FORWARD MOVEMENT (h)
1202
FORWARD MOVEMENT

FIG. 13

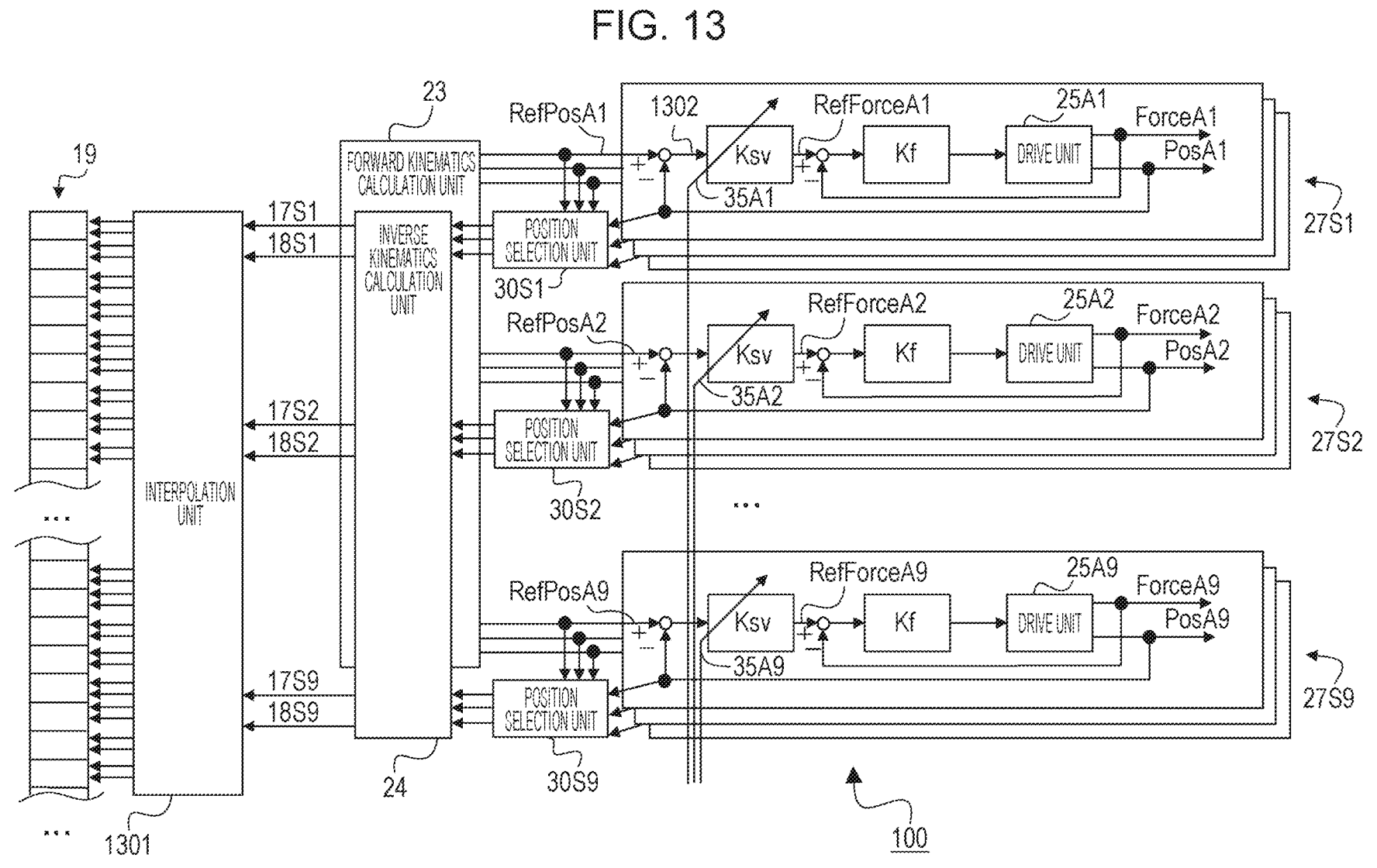

27S1
27S2
27S9
ForceA1
PosA1
ForceA2
PosA2
ForceA9
PosA9
25A1
25A2
25A9
DRIVE UNIT
Kf
RefForceA1
RefForceA2
RefForceA9
Ksv
35A1
35A2
35A9
1302
RefPosA1
RefPosA2
RefPosA9
POSITION SELECTION UNIT
30S1
30S2
30S9
23
FORWARD KINEMATICS CALCULATION UNIT
INVERSE KINEMATICS CALCULATION UNIT
24
17S1
18S1
17S2
18S2
17S9
18S9
INTERPOLATION UNIT
1301
19
100

FIG. 14

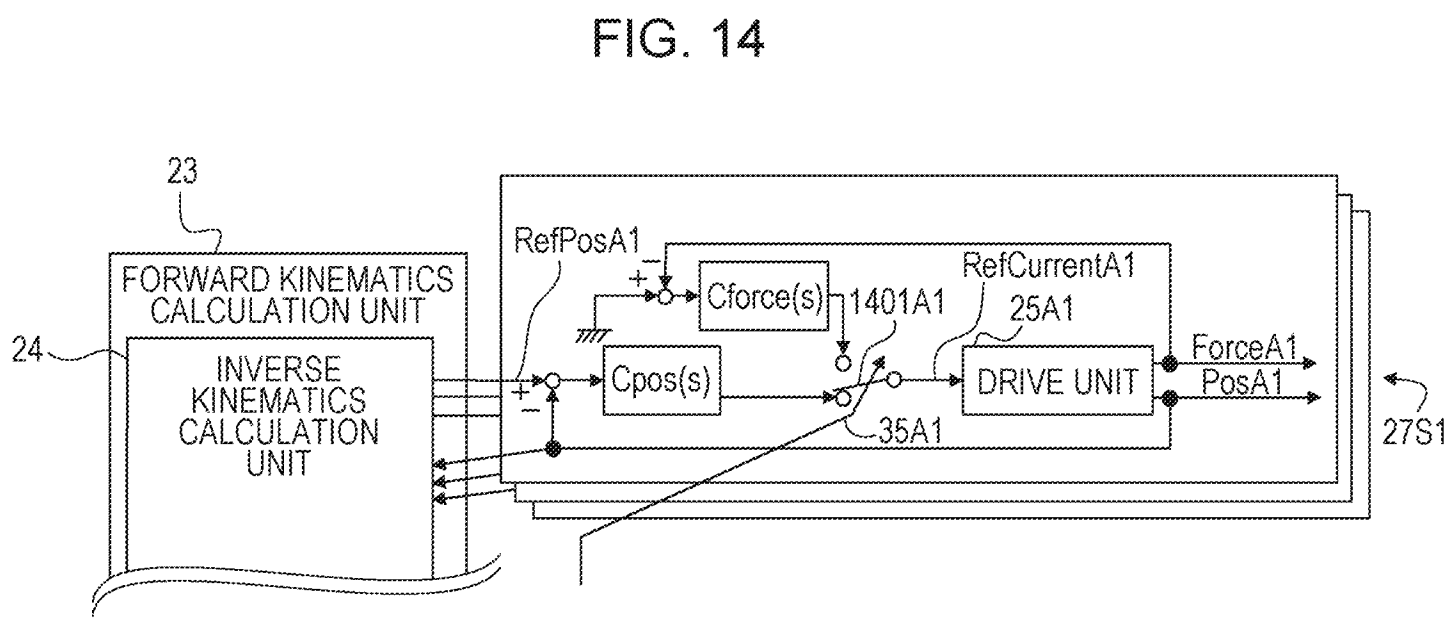

27S1
ForceA1
PosA1
DRIVE UNIT
RefCurrentA1
25A1
1401A1
35A1
Cforce(s)
Cpos(s)
RefPosA1
FORWARD KINEMATICS CALCULATION UNIT
INVERSE KINEMATICS CALCULATION UNIT
23
24

CONTINUUM ROBOT AND CONTROL METHOD FOR CONTINUUM ROBOT, AND RECORDING MEDIUM

CROSS-REFERENCE TO RELATED APPLICATIONS

This application is a Continuation of International Patent Application No. PCT/JP2023/004494, filed Feb. 10, 2023, which claims the benefit of Japanese Patent Application No. 2022-034500, filed Mar. 7, 2022, both of which are hereby incorporated by reference herein in their entireties.

TECHNICAL FIELD

The present invention relates to a continuum robot and a control method for the continuum robot, and a recording medium.

BACKGROUND ART

A continuum robot includes bendable portions having a flexible structure, and a shape of the continuum robot is controlled by deforming the bendable portions. This continuum robot have two main advantages over a robot constituted by rigid links (hereinafter, described as a "rigid-link robot"). The first advantage is that the continuum robot can move along a curve of an object by only operating a leading end of the continuum robot in such a confined space that the rigid-link robot gets stuck or in an environment where scattered objects are present. The second advantage is that since the continuum robot has inherent softness, it is possible to operate the continuum robot without causing a damage to a fragile object, in particular, in an open space. External force detection by an end effector, which is needed for the rigid-link robot, is not necessarily needed for the continuum robot.

By taking these advantages, the continuum robot is expected to be applied to a medical field such as an endoscopic sheath or a catheter or to an extreme work robot such as a rescue robot. As a method of driving this continuum robot, a tendon-driven method, a method using a pushable and pullable wire, a method using a pneumatic actuator, and the like have been proposed.

PTL 1 discloses an endoscope including a controller configured to control an attitude of bendable portions of the continuum robot, in which the controller controls succeeding bendable portions so as to be along a path through which the bendable portion positioned at the front in a travelling direction of the continuum robot has passed. Hereinafter, such attitude control will be referred to as "leading portion pursuit control". According to the endoscope having the controller that performs the leading portion pursuit control, at the time of insertion of the endoscope into a subject's body cavity set as an insertion target, by only operating the attitude of the bendable portion positioned at the front of an insertion direction by a user, the succeeding bendable portions are automatically controlled so as not to contact subject's body tissues. In addition, at the time of removal of the endoscope, since the attitude of each bendable portion is automatically controlled so as to be along the path through which the bendable portion has passed at the time of the insertion, the user does not necessarily need to operate the attitude of the bendable portion. In this manner, by using the leading portion pursuit control, it is possible to reduce a burden on the user at the time of insertion and removal of the continuum robot.

PTL 2 discloses an automatic navigation method in which such a patient's anatomical image as being generated by using computed tomography (CT) scanning, magnetic resonance imaging (MRI) scanning, similar methods, and the like is used, and a navigation path is decided before or during an operative treatment to perform the automatic navigation.

CITATION LIST

Patent Literature

PTL 1 Japanese Patent No. 4758646

PTL 2 Japanese Patent No. 6667691

In one of implementation modes of the leading portion pursuit control, to propagate the attitude of the leading bendable portion to the attitudes of the succeeding bendable portions at the time of forward movement of the continuum robot, processing of storing the attitude of the leading bendable portion and an insertion distance of the continuum robot in an attitude memory is performed. Here, the insertion distance of the continuum robot refers to a value which further increases as the continuum robot moves forward while, for example, an insertion start position into a body (body cavity) is set as 0.

After the continuum robot is sufficiently inserted into the body (body cavity), an operation of checking a surrounding by using a camera arranged in the leading portion of the continuum robot is performed for an inspection or the like. In this operation, an operation (hereinafter, described as a "look around operation") is performed to cause several bendable portions counting from the leading portion to bend without performing the forward movement of the continuum robot to check an entire area of an inspection target kept in a field of view. Here, since the above-described processing of storing the attitude of the leading bendable portion in the attitude memory is only performed at the time of the forward movement of the continuum robot, the attitude stored in the attitude memory and the attitude after the look around operation deviate from each other. In this state, when the forward movement or the backward movement of the continuum robot is performed, since the attitude is reverted to one stored in the attitude memory in the control, the bendable portions of the continuum robot may involve steep bending movement. In this aspect, PTL 1 does not mention a method of avoiding the above-described steep bending movement at the time of the forward movement or the backward movement of the continuum robot. PTL 2 illustrates two methods at the time of the backward movement which include a method of performing control to follow an external force and a method of regenerating a route. However, any one of the methods is needed to be selected as a default state, and the forward movement or the backward movement is not to be performed in a state in which the external force is regularly small.

SUMMARY OF INVENTION

The present invention has been made in view of the above-described issues, and is aimed to provide a continuum robot which is easy to operate and which is capable of performing forward movement or backward movement in a state in which an external force is small while steep bending movement is avoided at the time of the forward movement or the backward movement of the continuum robot.

A continuum robot according to an aspect of the present invention includes a plurality of bendable portions which are provided in series in a lengthwise direction and each of which is bendable, a forward and backward movement unit configured to cause the plurality of bendable portions to perform forward movement or backward movement in the lengthwise direction, an attitude change unit configured to cause each of the bendable portions in the plurality of bendable portions to bend to change an attitude of the bendable portion, a storage unit configured to store the attitude with regard to each of the bendable portions in the plurality of bendable portions, and a control unit configured to perform, when the forward movement or the backward movement caused by the forward and backward movement unit is detected, in a case where a first attitude that is an attitude of at least one bendable portion in the plurality of bendable portions deviates to a predetermined extent or beyond from a second attitude that is an attitude of the at least one bendable portion which is stored in the storage unit, switching or continuous transition as change control of the first attitude for the attitude change unit from first control for changing the attitude into a specified attitude to second control for changing the attitude following an external force.

In addition, the present invention includes a control method for the continuum robot, and a non-transitory recording medium having recorded thereon a program for causing a computer to execute the control method.

Further features of the present invention will become apparent from the following description of exemplary embodiments with reference to the attached drawings.

BRIEF DESCRIPTION OF DRAWINGS

FIG. 4 illustrates an example of a schematic configuration in a control system of the continuum robot according to the first embodiment of the present invention.

FIG. 12 is an explanatory diagram for describing the instance when the continuum robot according to the first embodiment of the present invention moves forward.

FIG. 13 illustrates the control system of the continuum robot according to the first embodiment of the present invention, illustrating a configuration example for performing processing of recalculating a track to update an attitude memory.

FIG. 14 illustrates an example of a schematic configuration of the attitude change unit of the continuum robot according to a second embodiment of the present invention.

DESCRIPTION OF EMBODIMENTS

Hereinafter, with reference to the drawings, modes (embodiments) for carrying out the present invention will be described.

First Embodiment

First of all, a first embodiment of the present invention will be described.

Figure 1:
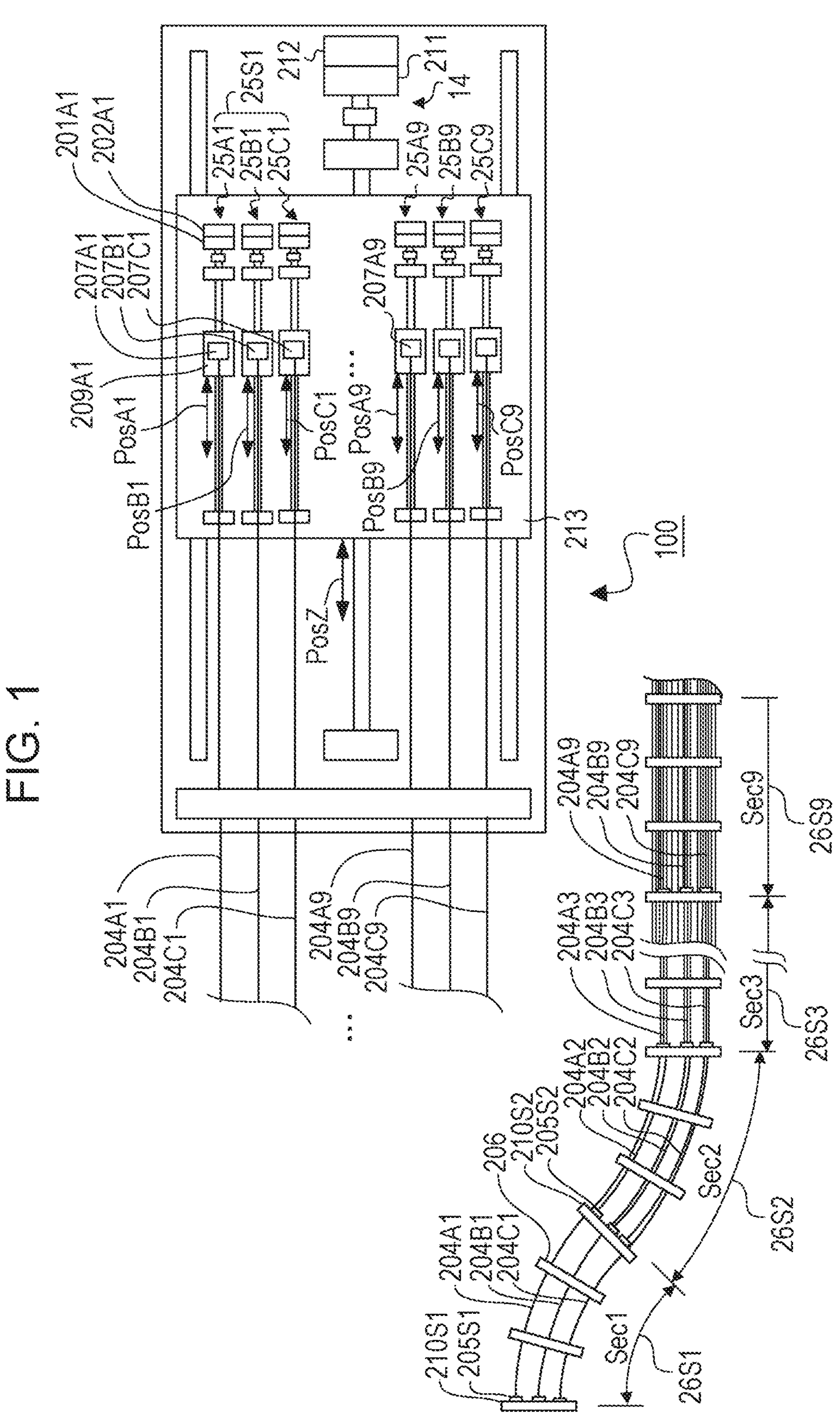
FIG. 1 illustrates an example of a schematic configuration of a continuum robot according to a first embodiment of the present invention.

FIG. 1 illustrates an example of a schematic configuration of a continuum robot 100 according to the first embodiment of the present invention. The continuum robot 100 includes a plurality of bendable portions 26S1 to 26S9 which are provided in series in a lengthwise direction and each of which is bendable. According to the present embodiment, in the plurality of bendable portions 26S1 to 2659, reference signs are added in order from a side of the most distal end as in the bendable portion 26S1, the bendable portion 26S2, . . . , and the bendable portion on a side of the most proximal end is defined as the bendable portion 2659. It is noted that the side of the proximal end is a side where wire drive units 25 are provided. In a manner that a section of the bendable portion 26S1 is defined as Sec1 and a section of the bendable portion 26S2 is defined as Sec2 and so on, a section of the bendable portion 2699 is defined as Sec9. It is noted that the number of bendable portions 26 is not limited to nine, and it is possible to expand the configuration to any N number of bendable portions 26. In the present specification, in a case where to which section the bendable portion 26 belongs is to be distinguished, supplementary reference signs such as S1, S2, . . . , S9 are added for identification. On the other hand, in a case where to which section the bendable portion 26 belongs is not necessarily needed to be distinguished, the supplementary reference signs such as S1 are not added, and a representation of "bendable portions 26" or the like is simply used. This manner of representation also applies to components other than the bendable portions 26.

Here, the bendable portion 26S1 will be described as a representative among the plurality of bendable portions 26S1 to 26S9.

The bendable portion 26S1 is a section denoted by Sec1. The bendable portion 26S1 includes a wire 204A1, a wire 204B1, and a wire 204C1. In the present specification, these three wires are important. The wire drive units 25 respectively corresponding to the wire 204A1, the wire 204B1, the wire 204C1, and so on are identified as the wire drive unit 25A1, the wire drive unit 25B1, the wire drive unit 25C1, and so on by being added with supplementary reference signs A, B, C, and so on. In addition, in Sec9, the wires 204 are represented as the wire 204A9, the wire 204B9, and the wire 204C9, and the wire drive units 25 corresponding to the wire 204A9, the wire 204B9, and the wire 204C9 are respectively represented as the wire drive unit 25A9, the wire drive unit 25B9, and the wire drive unit 25C9. This manner of representation also applies to components other than the wire drive units 25. In addition, when the three drive units of the wire drive unit 25A1, the wire drive unit 25B1, and the wire drive unit 25C1 are handled together, the three drive units are represented as "the wire drive unit 25S1" and the like.

The bendable portion 26S1 will be described again.

The bendable portion 26S1 includes the wire 204A1, the wire 204B1, and the wire 204C1 as described above. By pushing and pulling the wire 204A1 to the wire 204C1, the bendable portion 26S1 can be bent in up and down and front and back directions on a paper surface. The wire 204A1 to the wire 204C1 are fixed to a circular disc 210S1 via a wire fixing portion 20551. The wire 204A1 to the wire 204C1 are guided to a circular disc 206 having a hole and led to the wire drive unit 25A1 to the wire drive unit 25C1.

The second bendable portion 26S2 is a section denoted by Sec2. Similarly as in the bendable portion 26S1, by pushing and pulling the wire 204A2 to the wire 204C2, the bendable portion 26S2 can be bent in the up and down and front and back directions on the paper surface. The wire 204A2 to the wire 204C2 are fixed to a circular disc 210S2 via a wire fixing portion 20552. The wire 204A2 to the wire 204C2 are guided to the circular disc 206 having the hole and led to the wire drive unit 25A2 to the wire drive unit 25C2.

By arranging nine similar mechanisms in series in the lengthwise direction, the plurality of bendable portions 26S1 to 2659 are constituted. According to the present embodiment, among the plurality of bendable portions 26 provided so as to be continuous in series in the lengthwise direction, the bendable portion 26S1 farthest from the wire drive units 25 is referred to as a "distal end bendable portion", and the bendable portion 2659 closest to the wire drive units 25 is referred to as a "proximal end bendable portion".

The wire drive units 25 will be described.

The wire drive unit 25A1 can push and pull the wire 204A1 by driving a stage 209A1 forward and backward. The wire 204A1 is fixed to the stage 209A1 via a tension sensor 207A1. The stage 209A1 can be driven by rotating an actuator 201A1. A position of the stage 209A1 can be detected by a position detector 202A1. The position of the stage 209A1 will be referred to as "PosA1". In addition, a tension of the wire 204A1 can be measured by the tension sensor 207A1, and a measured value will be referred to as "ForceA1" (not illustrated). Herein, the wire drive unit 25A1 has been described, but the same also applies to the other wire drive units 25.

The continuum robot 100 also includes a forward and backward movement unit 14 configured to cause the plurality of bendable portions 26S1 to 2659 to perform forward movement or backward movement in the lengthwise direction. The forward and backward movement unit 14 can cause all the wires 204 to perform the forward movement or the backward movement by moving forward or backward a Z stage 213 to which the plurality of wire drive units 25 are mounted. The Z stage 213 can be driving by rotating an actuator 211. A position of the Z stage 213 can be detected by a position detector 212. The position of the Z stage 213 will be referred to as "PosZ".

It is noted that a rotary motor or the like can be used as an actuator 201 and the actuator 211. In addition, an encoder attached to the motor or the like can be used as the position detector 202 and the position detector 212.

Figure 2:
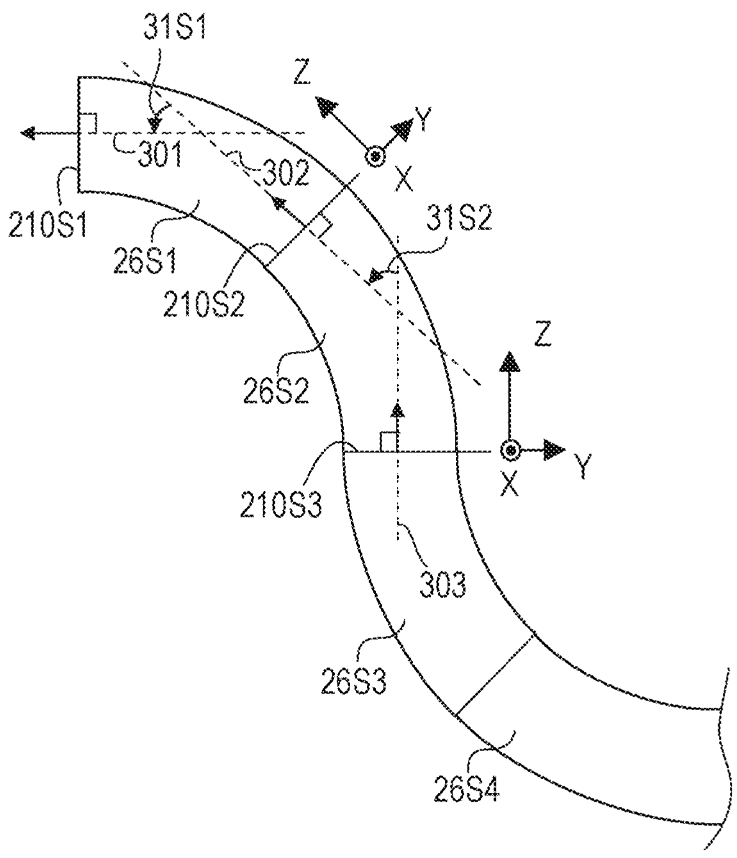
FIG. 2 is an explanatory diagram for describing bending angles at bendable portions of the continuum robot according to the first embodiment of the present invention.

FIG. 2 is an explanatory diagram for describing bending angles at the bendable portions 26 of the continuum robot 100 according to the first embodiment of the present invention. In FIG. 2, a component similar to the component illustrated in FIG. 1 is denoted by the same reference sign, and a detailed description thereof will not be repeated. According to the present embodiment, the attitude of the bendable portion 26 in a state in which the bendable portion 26 is bent is defined by a bending angle and a turning angle of the bendable portion 26. As illustrated in FIG. 2, a forward movement direction of the continuum robot 100 is defined as positive on a Z coordinate. In addition, as illustrated in FIG. 2, a direction of a Z axis changes for each of the bendable portions 26. A bending angle 31 is relatively defined for each of the bendable portions 26. For example, the bending angle 31S1 of the bendable portion 26S1 is defined as an angle formed by a normal vector 301 of the circular disc 210S1 and a normal vector 302 of the circular disc 210S2. Similarly, the bending angle 31S2 of the bendable portion 26S2 is defined as an angle formed by the normal vector 302 of the circular disc 210S2 and a normal vector 303 of the circular disc 210S3. The same also applies to the other bendable portions 26.

Figure 3:
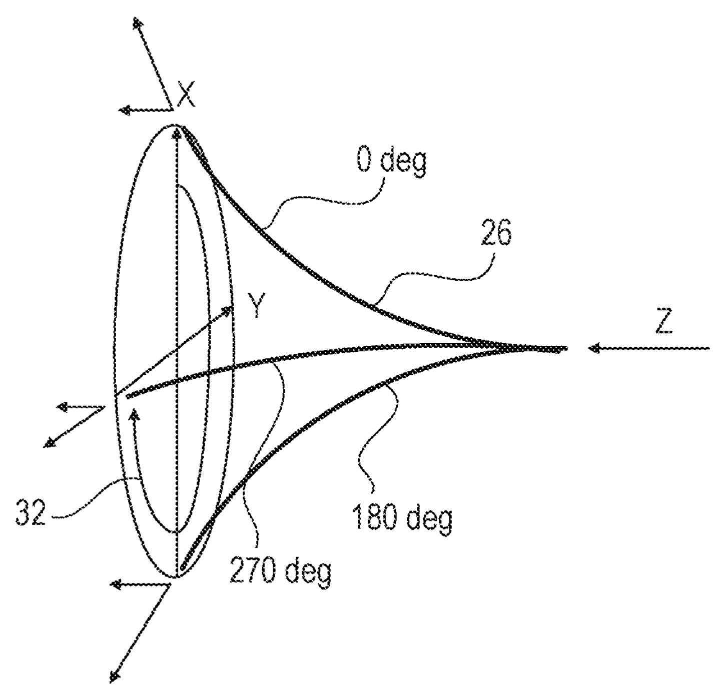
FIG. 3 is an explanatory diagram for describing turning angles at the bendable portion of the continuum robot according to the first embodiment of the present invention.

FIG. 3 is an explanatory diagram for describing turning angles at the bendable portions 26 of the continuum robot 100 according to the first embodiment of the present invention. FIG. 3 illustrates a state in which under a condition that the bending angle 31 of the bendable portion 26 is 60 degrees, turning angles 32 are 0 degrees, 180 degrees, and 270 degrees.

FIG. 4 illustrates an example of a schematic configuration in a control system of the continuum robot 100 according to the first embodiment of the present invention. With reference to FIG. 4, an operation at the time of the forward movement will be described.

An input apparatus 10 generates a bending target angle 101 and a turning target angle 102 of the bendable portion 26 based on an input from an operator. An input selection unit 22 decides for which section Sec among the sections Sec1 to Sec9 the bending target angle 101 and the turning target angle 102 are set as the target angles.

Figure 5:
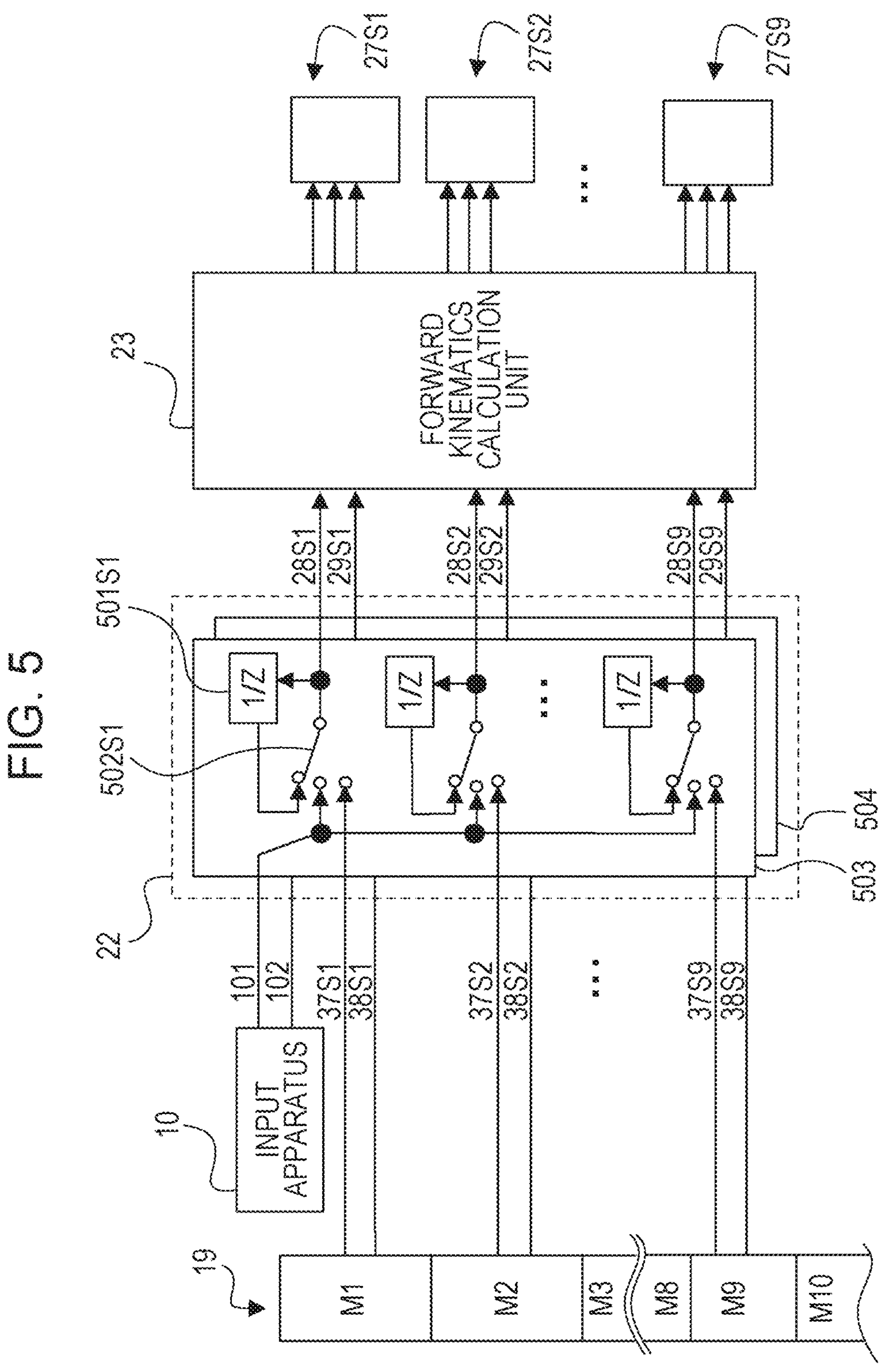
FIG. 5 illustrates an example of a schematic configuration of an input selection unit illustrated in FIG. 4.

FIG. 5 illustrates an example of a schematic configuration of the input selection unit 22 illustrated in FIG. 4. In FIG. 5, a component similar to the component illustrated in FIG. 4 is denoted by the same reference sign, and a detailed description thereof will not be repeated.

As illustrated in FIG. 5, the input selection unit 22 includes a bending target angle processing unit 503 and a turning target angle processing unit 504 to select the bending target angle 101 and the turning target angle 102. Here, the bending target angle processing unit 503 will be described as an example. The input selection unit 22 includes a selection switch 502 corresponding to each of the bendable portions 26 (see FIG. 1). One of three inputs from a self holding unit 501, the input apparatus 10, and an attitude memory 19 is selected by the selection switch 502. The selected signal is input to a forward kinematics calculation unit 23. In addition, the input selection unit 22 includes the self holding unit 501 corresponding to each of the bendable portions 26. The self holding unit 501 has a function of storing input data and outputting the stored data with a delay of one sample. At the time of the forward movement, basically, the selection switch 502 is selected as illustrated in Table 1 below.

TABLE 1

| | State of selection switch 502 |
|---|---|
| Sec1 | Input apparatus |
| Sec2 | Attitude memory |
| Sec3 | Attitude memory |
| . . . | . . . |
| Sec9 | Attitude memory |

A description will be provided on the attitude memory 19.

The attitude memory 19 is a storage unit configured to store an attitude with regard to each of the bendable portions 26 in the plurality of bendable portions 26S1 to 26S9. Specifically, the attitude memory 19 has an array structure and stores the bending angle and the turning angle corresponding to each of the bendable portions 26 for memory as the attitude of each of the bendable portions 26 (see FIG. 1). For example, the bending angle and the turning angle corresponding to the bendable portion 26S1 are stored at an address M1 of the attitude memory 19, and the bending angle and the turning angle corresponding to the bendable portion 26S2 are stored at an address M2. The bending angle and the turning angle are similarly stored at each of other addresses M of the attitude memory 19. The corresponding bendable portions 26 do not exist with regard to the address M10 and subsequent addresses of the attitude memory 19, but the address M10 and subsequent addresses are storage areas for leading portion pursuit control which will be described below. It is noted that the bendable portion 26 and each data in the attitude memory 19 do not necessarily need to be in a one-to-one relationship, and the attitude memory 19 corresponding to the single bendable portion 26 preferably has at least ten pieces of data for smooth movement. This will be described later with reference to FIG. 6.

The description will be provided with reference to FIG. 4 again.

Subsequently, the forward kinematics calculation unit 23 will be described. According to the present embodiment, an output of a position command (RefPos) that is to be taken by all the wires 204 (see FIG. 1) while a bending target angle 28 and a turning target angle 29 to each of the bendable portions 26 (see FIG. 1) are set as inputs is defined as forward kinematics. It is the forward kinematics calculation unit 23 that performs a calculation of the forward kinematics. Movement of the wires 204 (see FIG. 1) to a position that is to be taken is performed by each of the stages 209 (see FIG. 1).

Subsequently, an attitude change unit 27 will be described.

The attitude change unit 27 causes each of the bendable portions 26 in the plurality of bendable portions 26S1 to 2659 to bend by controlling this target position (RefPos) to change the attitude of the bendable portion 26. As a specific example, the attitude change unit 27A1 will be described. In the attitude change unit 27A1, position feedback control is performed to set a current position (PosA1) of the stage 209A1 (see FIG. 1) to a target value. That is, the attitude change unit 27A1 calculates a position error by subtracting the current position (PosA1) from the target position (RefPosA1) and multiplies the position error by a gain Ksv to calculate a force target value (RefForceA1). At this time, position control is still established by adding the force target value (RefForceA1) to the wire drive unit 25A1 as it is, but to perform control following an external force, force feedback is also performed according to the present embodiment. That is, the attitude change unit 27A1 subtracts a measured value (ForceA1) of the tension sensor 207A1 (see FIG. 1) from the force target value (RefForceA1) to obtain a force error, and multiplies the force error by a gain Kf to calculate a current command (RefCurrentA1) to be added to the wire drive unit 25A1. Herein, the attitude change unit 27A1 has been described, but the same also applies to the control of the other attitude change units 27. It is noted that a bundle of three attitude change units of the attitude change unit 27A1, the attitude change unit 27B1, and the attitude change unit 27C1 is represented as the attitude change unit 27S1.

Thus, at least one of bending and turning with regard to any of the bendable portions 26 can be performed by using the input apparatus 10.

Next, the leading portion pursuit control will be described.

The leading portion pursuit control refers to control in which each time forward movement is performed, the attitude of the distal end bendable portion is propagated to the bendable portions positioned on the proximal side, and in the case of backward movement, the attitude of the proximal end bendable portion is propagated to the bendable portions positioned on the distal side. With this configuration, it is sufficient for the operator to operate only the distal end bendable portion, and a burden caused by steering can be reduced.

This leading portion pursuit control will be described with reference to FIG. 4.

To perform the leading portion pursuit control, the bending angle 17S1 and the turning angle 18S1 that are attitude information of the distal end bendable portion need to be stored. The attitude information (stored attitude) is stored in each element of the array of the attitude memory 19 serving as the storage unit. According to the present embodiment, the attitude of each of the bendable portions 26 (see FIG. 1) is stored in the form of the bending angle 17 and the turning angle 18. In addition, according to the present embodiment, a calculation of the bending angle 17 and the turning angle 18 based on the position command (RefPos) of the attitude change unit 27 or the position (Pos) is defined as inverse kinematics. It is an inverse kinematics calculation unit 24 that performs the calculation of the inverse kinematics. Among the bending angles 17 and the turning angles 18 obtained by the inverse kinematics calculation unit 24, the bending angle 17S1 and the turning angle 18S1 of the distal end bendable portion are regularly written to the element (address) M1 of the array of the attitude memory 19.

It is noted that a reason why the position commands (RefPos) of all the attitude change units 27 or the positions (Pos) need to be used to obtain the bending angle 17S1 and the turning angle 18S1 of the distal end bendable portion is that there is a case where the wires 204 (see FIG. 1) do not pass through a cylindrical center. For example, when the intermediate bendable portion 26 (see FIG. 1) is bent, the wire 204 passing on an outer side of the bending needs a longer length than the wire 204 passing on an inner side of the bending. For this reason, the bending angle 17S1 and the turning angle 18S1 of the distal end bendable portion are not to be calculated using only the position (PosA1), the position (PosB1), and the position (PosC1) of the three wires 204 of the distal end bendable portion. It is noted that which signal of the position command (RefPos) or the position (Pos) is to be transmitted to the inverse kinematics calculation unit 24 is decided by a position selection unit 30. When a control system of the attitude change unit 27 which will be described below is the position control, the position command (RefPos) is selected. When the control system of the attitude change unit 27 is back-drivable control, the position (Pos) is selected. Herein, the back-drivable control refers to control in which the attitude is changed following an external force.

Next, processing at a time when forward movement is performed will be described.

The forward movement is performed when the operator operates an input apparatus 13. When the forward movement operation is performed, the Z stage 213 (see FIG. 1) of the forward and backward movement unit 14 moves forward, and all the wires 204 (see FIG. 1) move forward. According to this, the continuum robot 100 (see FIG. 1) moves forward. To perform the leading portion pursuit control, when the bendable portions 26 (see FIG. 1) move forward by a distance corresponding to one bendable portion, the attitude may be propagated from each one to the adjacent bendable portion on the proximal side. The position of the Z stage 213 is monitored, and when the bendable portions 26 move forward by the distance corresponding to one bendable portion, processing is performed to cause the attitude memory 19 to propagate by one bendable portion 26 each through propagation processing 20. For example, data at the address M11 of the attitude memory 19 is copied to M12, data at M10 is copied to M11, and so on. This operation is repeated, and when the operation of copying data at M1 to M2 is completed, the propagation processing 20 is completed. It is noted that for an illustrative purpose, the description is started from the data at M11 being copied to M12, but the operation is to be performed for all secured areas of the arrays of the attitude memory 19. When the number of arrays is N, the processing needs to be started from copying of data at M (N−1) to MN.

When the copying is completed, the succeeding bendable portion 26 (see FIG. 1) subsequent to the distal end bendable portion is controlled based on a bending target angle 37 and a turning target angle 38 which are read out from the attitude memory 19, and the attitude is propagated. In the case of the leading portion pursuit control, since the output of the input apparatus 10 is basically selected as a target value to the distal end bendable portion by the input selection unit 22, the bending target angle 28 and the turning target angle 29 to the succeeding bendable portion 26 are read from the attitude memory 19 without being disturbed by the input selection unit 22.

It is noted that according to the present embodiment, the example has been illustrated in which the attitude is propagated by the copying of the attitude memory 19, but instead of the copying, the propagation can also be realized by changing reference positions in the attitude memory 19. For example, in FIG. 4, the bendable portion 26S1, the bendable portion 26S2, . . . , the bendable portion 26S9 correspond to the addresses M1, M2, . . . , M9 of the attitude memory 19, but the propagation can be performed by only changing a correspondence relationship from M1, M2, . . . , M9 to M2, M3, . . . , M10.

The same also applies to a case where backward movement is performed, and the backward movement is performed when the operator operates the input apparatus 13. When the backward movement operation is performed, the Z stage 213 (see FIG. 1) of the forward and backward movement unit 14 moves backward, and all the wires 204 (see FIG. 1) move backward. For the propagation of the attitude at the time of the backward movement, when the bendable portions 26 (see FIG. 1) move backward by the distance corresponding to one bendable portion, the attitude may be propagated by one each to the adjacent bendable portion on the distal side. The position of the Z stage 213 is monitored, and when the bendable portions 26 move backward by the distance corresponding to one bendable portion, processing is performed to cause the attitude memory 19 to propagate by one bendable portion 26 each through the propagation processing 21. This operation may be performed through the operation of copying data at the address M2 of the attitude memory to M1, copying data at M3 to M2, . . . , and then copying data at MN to M (N−1). Subsequent processing is similar to the processing at the time of the forward movement. It is noted that at the time of the backward movement, as illustrated in Table 2 below, the input selection unit 22 preferably selects the target value from the attitude memory 19 in all the bendable portions 26.

TABLE 2

| | State of selection switch 502 |
|---|---|
| Sec1 | Attitude memory |
| Sec2 | Attitude memory |
| Sec3 | Attitude memory |
| . . . | . . . |
| Sec9 | Attitude memory |

Figure 6:
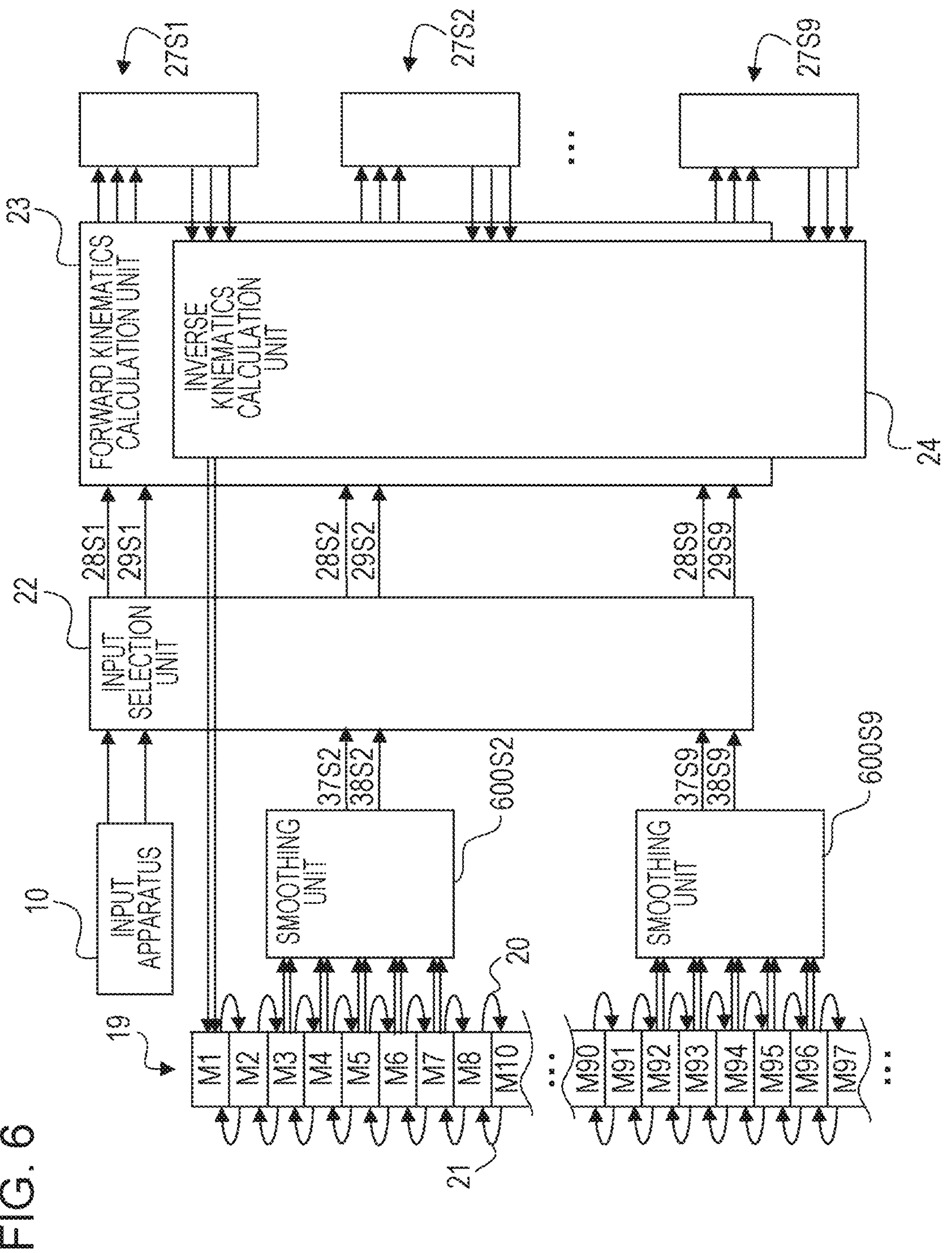
FIG. 6 illustrates the control system of the continuum robot according to the first embodiment of the present invention, illustrating a configuration example for performing leading portion pursuit control more smoothly.

FIG. 6 illustrates the control system of the continuum robot 100 according to the first embodiment of the present invention, illustrating a configuration example for performing the leading portion pursuit control more smoothly. In FIG. 6, a component similar to the component illustrated in FIG. 4 and FIG. 5 is denoted by the same reference sign, and a detailed description thereof will not be repeated.

In FIG. 4, to simplify the description, the case has been described where the position of the Z stage 213 is monitored, and the propagation processing is performed when the bendable portions 26 move by the distance corresponding to one bendable portion, but the propagation processing can also be performed more meticulously. For example, as illustrated in FIG. 6, the attitude memory 19 is further divided into smaller areas, and when the Z stage 213 (see FIG. 1) moves forward by a distance shorter than one bendable portion 26, the propagation processing 20 may be implemented. Similarly, when the Z stage 213 moves backward by a distance shorter than one bendable portion 26, the propagation processing 21 may be implemented. In this case, the attitude of the distal end bendable portion is stored in the attitude memory 19 in more detail. In addition, a smoothing unit 600 illustrated in FIG. 6 can be used to calculate the bending target angle 37 and the turning target angle 38. The smoothing unit 600 can perform smoothing processing by using a plurality of array elements propagated on the attitude memory 19 as attitude information inputs. For example, processing of calculating an arithmetic mean or the like can be applied as this smoothing processing. With this configuration, even when the operator performs a steep operation, since smoothing is performed by the smoothing unit 600, the smooth movement is realized. The leading portion pursuit control has been described above.

Figure 7:
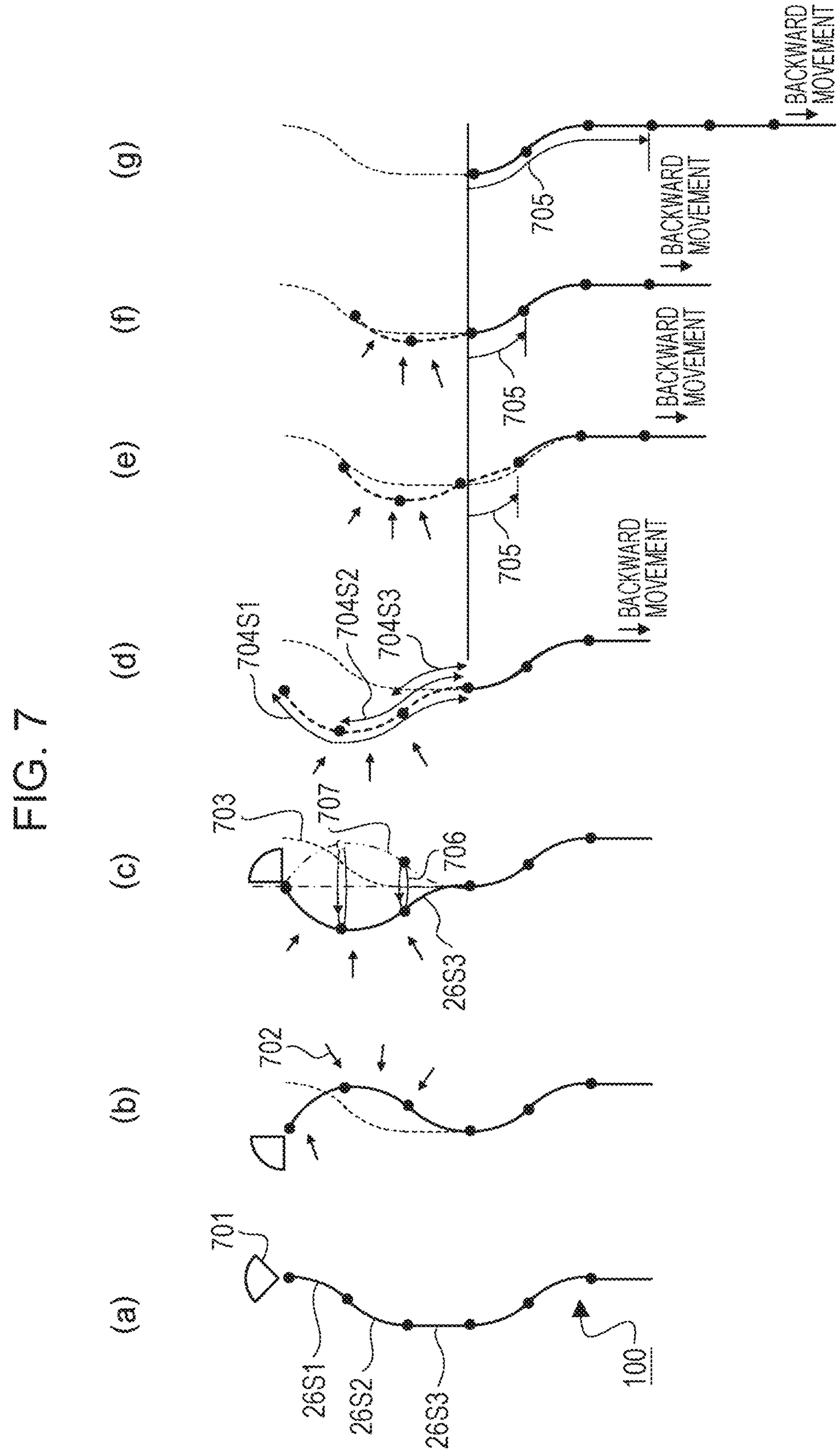
FIG. 7 is an explanatory diagram for describing an instance when the continuum robot according to the first embodiment of the present invention moves backward.

FIG. 7 is an explanatory diagram for describing an instance when the continuum robot 100 according to the first embodiment of the present invention moves backward. In FIG. 7, a component similar to the component illustrated in FIG. 1 and FIG. 2 is denoted by the same reference sign, and a detailed description thereof will not be repeated. Herein, a look around operation that is an operation of checking an entire area of an inspection target kept in a field of view and a subsequent backward movement operation will be described. It is noted that since the attitude of the distal end bendable portion is stored in the attitude memory 19 only at the time of the forward movement, the attitude stored in the attitude memory 19 and the attitude after the look around operation deviate from each other. When forward movement or backward movement is performed in this state, since the attitude reverts to the attitude stored in the attitude memory 19, the steep bending movement may be involved. A method of avoiding this steep bending movement will be described.

A state in which the forward movement of the bendable portions 26 of the continuum robot 100 is completed is illustrated in (a) in FIG. 7. Herein, it is assumed that the bendable portions 26 of the continuum robot 100 move inside a pipe having a flexibility to some extent. The operator selects a track with a small external force from a wall surface to cause the bendable portions 26 of the continuum robot 100 to move forward while checking a camera field of view 701.

A state in which the bendable portion 26S2 and the bendable portion 26S3 are bent for the look around operation is illustrated in (b) in FIG. 7. At this time, since the attitude change unit 27 (see FIG. 4) configured to cause each of the bendable portions 26 to bend performs the position control, an external force 702 from the wall surface becomes larger than that of (a) in FIG. 7. It is noted that the operation of causing the bendable portion 26S2 and the bendable portion 26S3 to bend is performed by switching the selection switch 502 of the input selection unit 22 (see FIG. 5). When the bendable portion 26S2 is operated, the selection switch 502 (see FIG. 5) of the input selection unit 22 is switched as illustrated in Table 3 below.

TABLE 3

| | State of selection switch 502 |
|---|---|
| Sec1 | Input apparatus ⇒ Self holding unit |
| Sec2 | Attitude memory ⇒ Input apparatus |
| Sec3 | Attitude memory |
| . . . | . . . |
| Sec9 | Attitude memory |

It is noted that in this operation, it is sufficient for the operator to simply perform the operation of switching the input selection unit 22 (see FIG. 5) from the section Sec1 to the section Sec2. Such programming is implemented in advance that the past bendable portion 26 (see FIG. 1) selected by the input selection unit 22 (see FIG. 5) is to be switched to the self holding unit 501.

In this state, the bendable portion 26S2 is caused to bend at a desired angle. Next, the selection switch 502 (see FIG. 5) of the input selection unit 22 (see FIG. 5) is switched as illustrated in Table 4 below. It is noted that this operation for the operator is to simply perform the operation of switching the input selection unit 22 from the section Sec2 to the section Sec3.

TABLE 4

| | State of selection switch 502 |
|---|---|
| Sec1 | Self holding unit |
| Sec2 | Input apparatus ⇒ Self holding unit |
| Sec3 | Attitude memory ⇒ Input apparatus |
| . . . | . . . |
| Sec9 | Attitude memory |

Subsequently, as illustrated in (c) in FIG. 7, the bendable portion 26S3 is caused to perform turning 706 to carry out the look around operation. An attitude 707 indicated by a dashed-two dotted line illustrates an attitude of the bendable portions 26 of the continuum robot 100 before the turning 706 is performed. A state in which the look around operation is completed is illustrated in (c) in FIG. 7. At this time, the attitude 703 of the bendable portion 26 which is stored in the attitude memory 19 and the attitude of each of the bendable portions 26 deviate from each other. When the backward movement operation is performed in this state, the steep movement occurs. In view of the above, according to the present embodiment, processing in the flowchart illustrated in FIG. 8 is performed.

Figure 8:
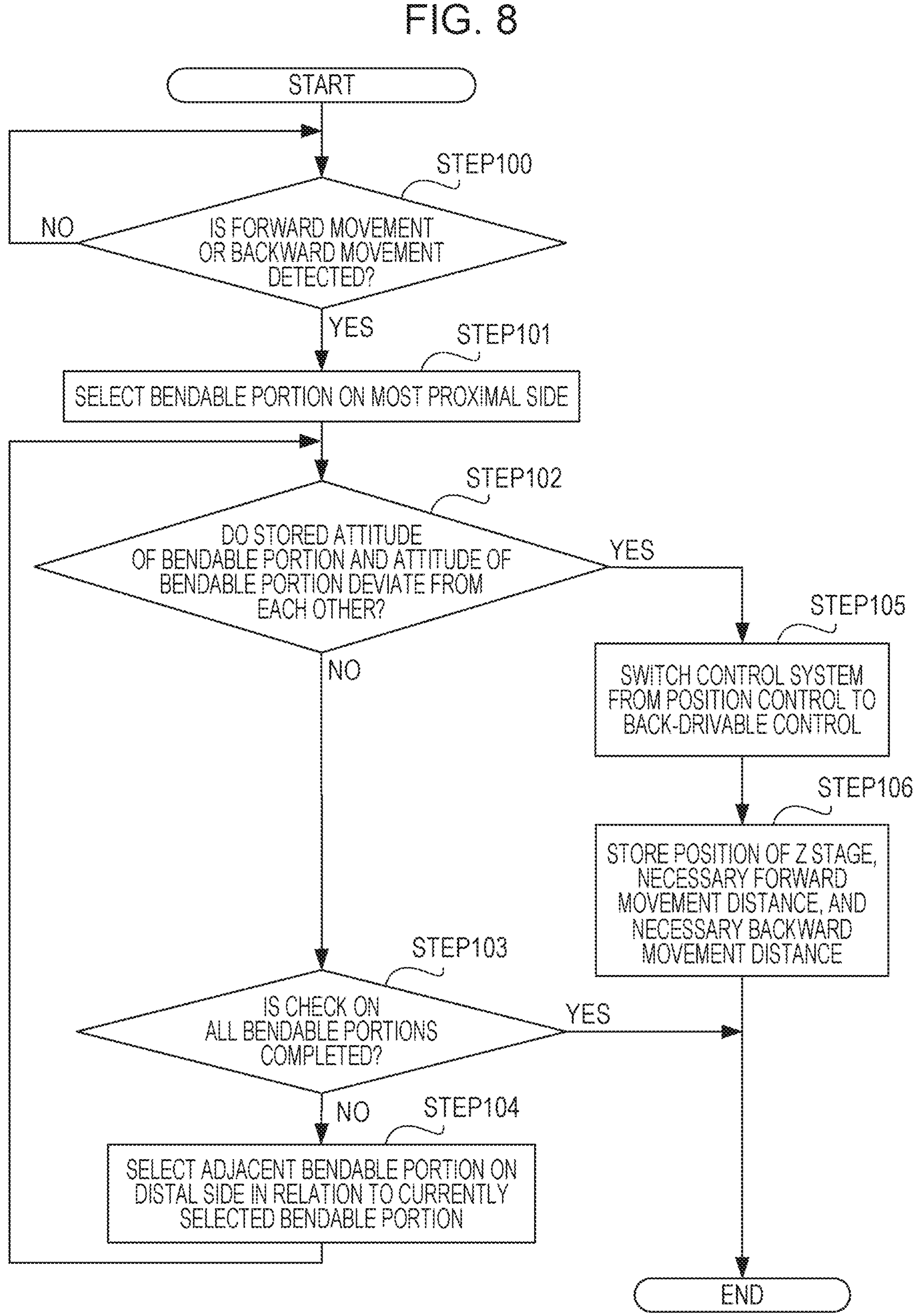
FIG. 8 is a flowchart illustrating an example of a processing procedure in a control method for the continuum robot according to the first embodiment of the present invention.

FIG. 8 is a flowchart illustrating an example of a processing procedure in a control method for the continuum robot 100 according to the first embodiment of the present invention. Specifically, FIG. 8 is a flowchart in which as the change control of the attitude of the predetermined bendable portion 26, switching or the like is performed from the position control (first control) for changing the attitude into a specified attitude to the back-drivable control (second control) for changing the attitude following an external force. The processing in the flowchart illustrated in FIG. 8 is mainly performed by a control switching unit 15 (control unit) and a deviation determination unit 16 which are illustrated in FIG. 4.

First, in STEP100 of FIG. 8, the control switching unit 15 determines whether or not forward movement or backward movement of the bendable portions 26 of the continuum robot 100 is detected based on an input from the forward and backward movement unit 14. As a result of this determination, when the forward movement or the backward movement of the bendable portions 26 of the continuum robot 100 is not detected (STEP100/NO), the flow stands by in STEP100 until the forward movement or the backward movement of the bendable portions 26 of the continuum robot 100 is detected.

On the other hand, as a result of the determination in STEP100, when the forward movement or the backward movement of the bendable portions 26 of the continuum robot 100 is detected (STEP100/YES), the flow proceeds to STEP101. Herein, a case where the backward movement of the bendable portions 26 of the continuum robot 100 is detected will be described. When the input apparatus 13 (see FIG. 4) is operated by the operator, the Z stage 213 (see FIG. 1) of the forward and backward movement unit 14 (see FIG. 4) moves backward. When the Z stage 213 moves backward, the position (PosZ) of the Z stage 213 (see FIG. 1) is input to the control switching unit 15. The control switching unit 15 monitors the position (PosZ) and detects the backward movement at this time.

When the flow proceeds to STEP101, for example, the deviation determination unit 16 selects the bendable portion 26 on the most proximal side (in the example illustrated in FIG. 1, the bendable portion 26S9).

Subsequently, in STEP102, the deviation determination unit 16 determines whether or not the attitude (first attitude) of the selected bendable portion 26 and the attitude 703 (see FIG. 7: the second attitude) of the bendable portion 26 which is stored in the attitude memory 19 deviate from each other to a predetermined extent or beyond. Herein, the attitude (first attitude) of the selected bendable portion 26 is equivalent to the bending angle 17 and the turning angle 18 which are output by the inverse kinematics calculation unit 24 (see FIG. 4) which performs a calculation using inverse kinematics based on a displacement position or a rotation amount of the actuator 201. In addition, the attitude 703 (see FIG. 7: the second attitude) of the bendable portion 26 which is stored in the attitude memory 19 is equivalent to the bending target angle 37 (see FIG. 4) and the turning target angle 38 (see FIG. 4) which are taken out from the attitude memory 19 (see FIG. 4).

As a result of the determination in STEP102, when the attitude of the selected bendable portion 26 and the attitude 703 of the bendable portion 26 which is stored in the attitude memory 19 do not deviate from each other to the predetermined extent or beyond (STEP102/NO), the flow proceeds to STEP103. For example, in the example illustrated in FIG. 7, when the selected bendable portion 26 is the bendable portion 26 on the most proximal side, the determination in STEP102 is negative (NO), and the flow proceeds to STEP103.

When the flow proceeds to STEP103, the deviation determination unit 16 determines whether or not the check on all the bendable portions 26 is completed.

As a result of the determination in STEP103, when the check on all the bendable portions 26 is not completed (STEP103/NO), the flow proceeds to STEP104. Herein, when the selected bendable portion 26 is the bendable portion 26S1 on the most distal side, STEP103/YES is determined. On the other hand, for example, when the selected bendable portion 26 is the bendable portion 26 other than the bendable portion 26S1, such as the bendable portion 2659 on the most proximal side, STEP103/NO is determined, and the flow proceeds to and STEP104.

When the flow proceeds to STEP104, the deviation determination unit 16 selects the adjacent bendable portion 26 on the distal side in relation to the currently selected bendable portion 26. Thereafter, the flow returns to STEP102, and the processing in STEP102 and subsequent steps is performed with regard to the bendable portion 26 selected in STEP104.

In addition, as a result of the determination in STEP102, when the attitude of the selected bendable portion 26 and the attitude 703 of the bendable portion 26 which is stored in the attitude memory 19 deviate from each other to a predetermined extent or beyond (STEP102/YES), the flow proceeds to STEP105. In the example illustrated in FIG. 7, since the bendable portions up to the third bendable portion 26S3 from the distal side have been operated, STEP102/YES is determined at a point in time when the bendable portion 26S3 is selected, and the flow proceeds to STEP105.

When the flow proceeds to STEP105, the control switching unit 15 performs switching from the position control for changing the attitude into the specified attitude (first control) to the back-drivable control (second control) to change the attitude following the external force as the change control in the control system of the attitude change unit 27 (see FIG. 4). Specifically, the control switching unit 15 (see FIG. 4) performs the switching by setting Ksv=0 in the attitude change unit 27 in response to a switching signal 35 (see FIG. 4). In more detail, when Ksv=0 is set in the attitude change unit 27, the position command (RefPos) is ignored, and the switching to the control following the external force occurs. Herein, in the processing in STEP105, the control switching unit 15 preferably switches all bendable portions 26 on the distal side in relation to the currently selected bendable portion 26S3 to the back-drivable control. Therefore, in this example, the control switching unit 15 sets Ksv in the attitude change unit 27S3, the attitude change unit 27S2, and the attitude change unit 27S1 as Ksv=0.

Subsequently, in STEP106, for example, the control switching unit 15 stores the position (PosZ) of the Z stage 213 (see FIG. 1) at a point in time when the control system of the attitude change unit 27 is switched from the position control to the back-drivable control. Furthermore, for example, the control switching unit 15 stores a necessary forward movement distance 1201 (see FIG. 12) and a necessary backward movement distance 704 (see FIG. 7) which will be described below. Herein, the necessary forward movement distance 1201 and the necessary backward movement distance 704 become a constant distance. In addition, the information stored in STEP106 will be used later to revert the control system from the back-drivable control to the position control.

When the processing in STEP106 is ended or when it is determined in STEP103 that the check on all the bendable portions 26 is completed (STEP103/YES), the processing in the flowchart illustrated in FIG. 8 is ended.

When the look around operation or the like is not performed, it is determined in STEP102 that the attitude of the selected bendable portion 26 and the attitude 703 of the bendable portion 26 which is stored in the attitude memory 19 do not deviate from each other to the predetermined extent or beyond (STEP102/NO) and it is determined in STEP103 that the check on all the bendable portions 26 is completed (STEP103/YES). Since the processing in the flowchart illustrated in FIG. 8 is then ended, the control system is not switched to the back-drivable control.

During the forward movement, in the distal end bendable portion, the input of the input apparatus 10 (see FIG. 4) is enabled, but as illustrated in FIG. 4, the bending angle 17S1 and the turning angle 18S1 of the distal end bendable portion are regularly written to the attitude memory 19, so that no deviation occurs. Therefore, the determination is also unnecessary, and the section Sec1 is not included as the input of the deviation determination unit 16 (see FIG. 4).

The description will be provided with reference to FIG. 7 again.

A state in which the processing in the flowchart illustrated in FIG. 8 is executed and the bendable portions up to the third bendable portion 26 from the distal end side are switched to the back-drivable control is illustrated in (d) in FIG. 7. The bendable portions 26 in which the back-drivable control is enabled are indicated by bold broken lines, and the bendable portions 26 in which the position control is enabled are indicated by bold solid lines in (d) in FIG. 7.

Next, a method for reversion from the back-drivable control to the position control will be described.

In STEP106 of FIG. 8, the necessary backward movement distance 704 is stored. The necessary backward movement distance 704 refers to a distance used for the bendable portion 26 to revert to the position control when the Z stage 213 moves backward by the distance. The necessary backward movement distance 704 is set for each of the bendable portions 26 under the back-drivable control. In the case of this example, the necessary backward movement distance 704 is set from the bendable portion 26S1 up to the bendable portion 26S3, and as illustrated in (d) in FIG. 7, those distances are the necessary backward movement distance 704S1, the necessary backward movement distance 704S2, and the necessary backward movement distance 704S3. In addition, the necessary backward movement distance 704 further increases in ascending order from the bendable portion on the most proximal side to the bendable portion on the distal side among the bendable portions 26 under the back-drivable control. That is, in the case of this example, the necessary backward movement distance 704S3 of the bendable portion 26S3 becomes a distance corresponding to one bendable portion 26, the necessary backward movement distance 704S2 of the bendable portion 26S2 becomes a distance corresponding to two bendable portions 26, and the necessary backward movement distance 704S1 of the bendable portion 26S1 becomes a distance corresponding to three bendable portions 26.

Figure 9:
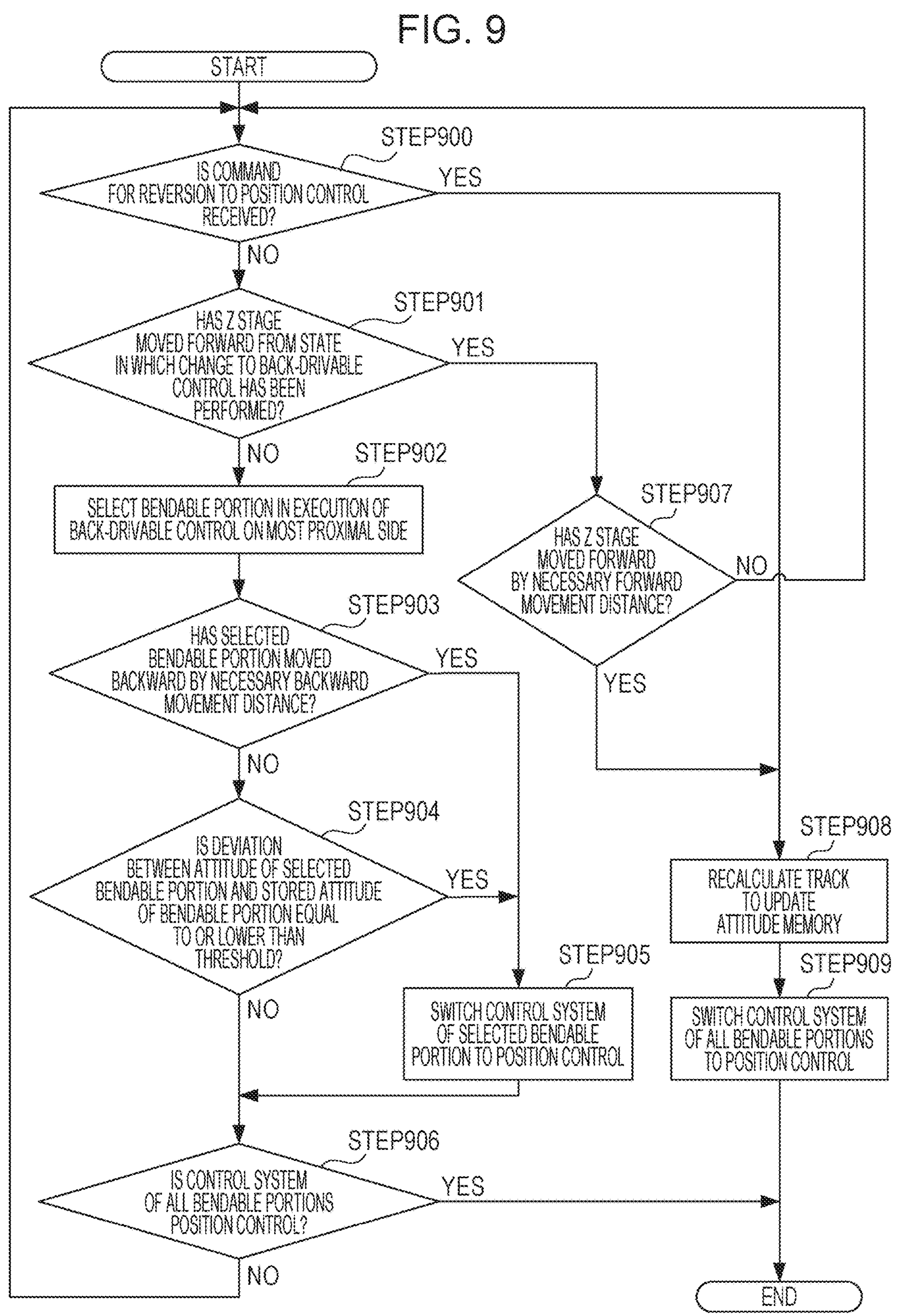
FIG. 9 is a flowchart illustrating an example of the processing procedure in the control method for the continuum robot according to the first embodiment of the present invention.

FIG. 9 is a flowchart illustrating an example of the processing procedure in the control method for the continuum robot 100 according to the first embodiment of the present invention. Specifically, FIG. 9 is a flowchart for reversion to the position control (first control) from the back-drivable control (second control) when a predetermined condition is met.

First, in STEP900 of FIG. 9, for example, the control switching unit 15 determines whether or not a command for reversion to the position control is received. Herein, according to the present embodiment, it is possible for all the bendable portions 26 to immediately revert to the position control by a press or the like on an operation switch (not illustrated) by the operator.

As a result of the determination in STEP900, when the command for reversion to the position control is not received (STEP900/NO), the flow proceeds to STEP901.

When the flow proceeds to STEP901, for example, the control switching unit 15 determines whether or not the Z stage has moved forward from a state in which the change to the back-drivable control has been performed. This determination in STEP901 can be performed by comparing the position of the Z stage 213 (see FIG. 1) which is stored in STEP106 of FIG. 8 with the current position (PosZ) of the Z stage 213 (see FIG. 1).

As a result of the determination in STEP901, when the Z stage has not moved forward from the state in which the change to the back-drivable control has been performed (STEP901/NO), the flow proceeds to STEP902. In the example illustrated in FIG. 7, since the Z stage has moved backward, STEP901/NO is determined, and the flow proceeds to STEP902.

When the flow proceeds to STEP902, for example, the control switching unit 15 selects the bendable portion 26 (see FIG. 1) on the most proximal side from among the bendable portions 26 in which the back-drivable control is being executed. In the example illustrated in FIG. 7, the bendable portion 26S3 is selected.

Subsequently, in STEP903, for example, the control switching unit 15 determines whether or not the bendable portion 26 selected in STEP902 has moved backward by a necessary backward movement distance. In this example, the necessary backward movement distance 704S3 (see FIG. 7) is compared with a backward movement distance 705 (see FIG. 7).

As a result of the determination in STEP903, when the bendable portion 26 selected in STEP902 has not moved backward by the necessary backward movement distance (STEP903/NO), the flow proceeds to STEP904. In the case of the example illustrated in (e) in FIG. 7, since the necessary backward movement distance 704S3 is larger than the backward movement distance 705, STEP903/NO is determined, and the flow proceeds to STEP904. Herein, the backward movement distance 705 is defined in a manner that the processing in STEP105 of FIG. 8 is executed to find out how far the Z stage 213 (see FIG. 1) has moved backward from the position where the switching to the back-drivable control has been performed.

When the flow proceeds to STEP904, for example, the control switching unit 15 determines whether or not a deviation between the attitude of the bendable portion 26 selected in STEP902 and the attitude 703 of the bendable portion 26 which is stored in the attitude memory 19 is equal to or lower than a threshold.

When it is determined in STEP904 that the deviation related to the attitude is equal to or lower than the threshold (STEP904/YES) or when it is determined in STEP903 that the bendable portion 26 selected in STEP902 has moved backward by the necessary backward movement distance (STEP903/YES), the flow proceeds to STEP905. Herein, when the backward movement has been performed up to a position as illustrated in (f) in FIG. 7, since the backward movement distance 705 (see FIG. 7) is larger than the necessary backward movement distance 704S3 (see FIG. 7), STEP903/YES is determined, and the flow proceeds to STEP905.

When the flow proceeds to STEP905, the control switching unit 15 switches the control system of the bendable portion selected in STEP902 from the back-drivable control to the position control. In the example illustrated in FIG. 7, since the bendable portion 26S3 is selected in STEP902, the attitude change unit 27S3 (see FIG. 4) is switched from the back-drivable control to the position control. Specifically, in the switching in STEP905, the switching to the position control is performed by substituting a constant value for Ksv in the attitude change unit 27S3.

When the processing in STEP905 is ended or when it is determined in STEP904 that the deviation related to the attitude is not equal to or lower than the threshold (STEP904/NO), the flow proceeds to STEP906.

When the flow proceeds to STEP906, the control switching unit 15 determines whether or not the control system in all the bendable portions 26 is the position control.

As a result of the determination in STEP906, when the control system in all the bendable portions 26 is not the position control (STEP906/NO), the flow returns to STEP900. In this example, since the control system in the bendable portion 26S1 to 2653 related to the attitude change unit 27S1, the attitude change unit 27S2, and the attitude change unit 27S3 is the back-drivable control, STEP906/NO is determined, and the flow returns to STEP900.

On the other hand, as a result of the determination in STEP906, when the control system in all the bendable portions 26 is the position control (STEP906/YES), the processing in the flowchart of FIG. 9 is ended. In the example illustrated in FIG. 7, when the backward movement has been performed up to a position as illustrated in (g) in FIG. 7, since the backward movement distance 705 becomes larger than all the necessary backward movement distances 704, all the attitude change units 27 (see FIG. 4) revert to the position control in STEP905, and as a result, STEP906/YES is determined, so that the processing in the flowchart of FIG. 9 is ended.

Herein, an example will be described in which it is determined in STEP904 of FIG. 9 that the deviation between the attitude of the bendable portion 26 selected in STEP902 and the attitude 703 of the bendable portion 26 which is stored in the attitude memory 19 is equal to or lower than the threshold.

Figure 10:
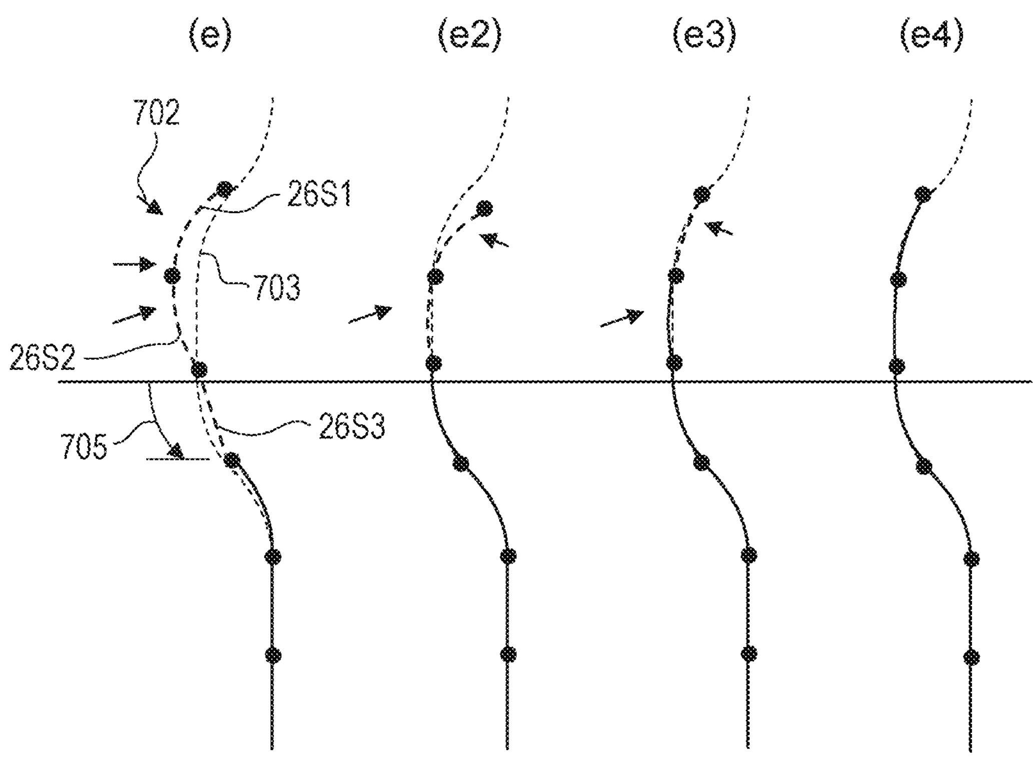
FIG. 10 is an explanatory diagram for describing an instance when the continuum robot according to the first embodiment of the present invention moves backward, illustrating an example in which control by an attitude change unit reverts to position control due to an external force.

FIG. 10 is an explanatory diagram for describing an instance when the continuum robot 100 according to the first embodiment of the present invention moves backward, illustrating an example in which the control system of the attitude change unit 27 is reverted to the position control due to the external force 702. In FIG. 10, a component similar to the component illustrated in FIG. 7 is denoted by the same reference sign, and a detailed description thereof will not be repeated. In addition, (e) in FIG. 10 illustrates the same state as (e) in FIG. 7.

It is assumed that the attitude of the bendable portion 26S3 is becoming to be like the attitude 703 of the bendable portion 263 which is stored in the attitude memory 19 by the external force 702 illustrated in (e) in FIG. 10. In this case, it is determined in STEP904 of FIG. 9 that the deviation between the attitude of the bendable portion 26S3 and the attitude 703 of the bendable portion 26S3 which is stored in the attitude memory 19 is equal to or lower than the threshold, and the flow proceeds to STEP905. With this configuration, the control system of the attitude change unit 27S3 is changed to the position control. This state is illustrated in (e2) in FIG. 10.

Then, according to the present embodiment, it is determined whether or not the deviation between the attitude of the bendable portion 2652 and the attitude 703 of the bendable portion 26S2 which is stored in the attitude memory 19 is equal to or lower than the threshold. When the deviation becomes equal to or lower than the threshold due to the external force 702, the control system of the attitude change unit 27S2 is changed to the position control. This state is illustrated in (e3) in FIG. 10. Similarly, when the control system of the attitude change unit 27S1 of the distal end bendable portion is changed to the position control, STEP906/YES in FIG. 9 is determined, and the processing in the flowchart of FIG. 9 is ended.

It is noted that for the determination in STEP904 of FIG. 9, the bending angle 17 (see FIG. 4) and the turning angle 18 (see FIG. 4) may be directly compared with the bending target angle 37 (see FIG. 4) and the turning target angle 38 (see FIG. 4), but a distance may be calculated on a three-dimensional space to carry out the determination.

Figure 11:
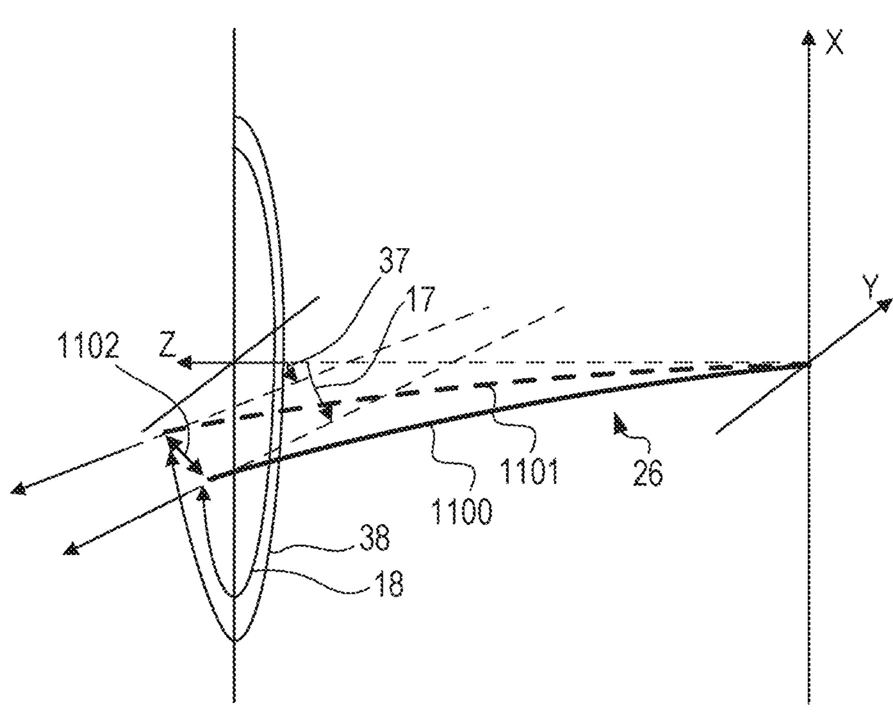
FIG. 11 illustrates an example of an attitude deviation determination method in STEP904 of FIG. 9.

FIG. 11 illustrates an example of a method for the attitude deviation determination in STEP904 in FIG. 9. One side of an attitude 1100 of the bendable portion 26 and one side of an attitude 1101 stored in the attitude memory 19 are fixed on the same point, and for example, the control switching unit 15 calculates positions on the other sides on the three-dimensional space by using the bending angle 17 and the turning angle 18 and the bending target angle 37 and the turning target angle 38. Thereafter, for example, the control switching unit 15 calculates a distance 1102 between points that are not on the same point side. Finally, for example, by comparing the distance 1102 with a threshold, the control switching unit 15 checks a deviation between the attitude 1100 of the bendable portion 26 and the attitude 1101 of the bendable portion 26 which is stored in the attitude memory 19.

It is noted that in a case where the external force 702 is involved, a condition where the deviation in STEP904 of FIG. 9 between the attitude of the bendable portion 26 and the attitude of the bendable portion 26 which is stored in the attitude memory 19 becomes equal to or lower than the threshold is not necessarily met. In the above-described case, reversion to the position control needs to be performed by the method of performing the backward movement, or the command for reversion to the position control needs to be transmitted. The instance when the continuum robot 100 moves backward upon application of the present invention has been described above.

Next, an instance when the continuum robot 100 moves forward will be described.

FIG. 12 is an explanatory diagram for describing the instance when the continuum robot 100 according to the first embodiment of the present invention moves forward. In FIG. 12, a component similar to the component illustrated in FIG. 7 is denoted by the same reference sign, and a detailed description thereof will not be repeated. In addition, (d) in FIG. 12 illustrates the same state as (d) in FIG. 7. Hereinafter, a method for reversion from the back-drivable control at the time of the forward movement to the position control will be described with reference to the flowchart of FIG. 9 and FIG. 12.

In STEP106 of FIG. 8, the necessary forward movement distance 1201 illustrated in (d) in FIG. 12 is stored. The necessary forward movement distance 1201 refers to a distance for performing the processing of reverting the bendable portions 26 to the position control when the Z stage 213 (see FIG. 1) moves forward by the above-described distance. Specifically, the necessary forward movement distance 1201 becomes the length of the bendable portions 26 under the back-drivable control.

In this example, since the bendable portion 26S1, the bendable portion 2652, and the bendable portion 26S3 are under the back-drivable control, the necessary forward movement distance 1201 becomes a distance corresponding to the three bendable portions 26.

Here, the description will be provided with reference to the flowchart of FIG. 9.

Since this example is an example in the case of STEP900/NO in FIG. 9, the flow proceeds to STEP901, and the forward movement is performed. Thus, STEP901/YES is determined, and the flow proceeds to STEP907. In STEP907, for example, the control switching unit 15 determines whether or not the Z stage 213 has moved forward by a distance beyond the necessary forward movement distance 1201. As a result of this determination, when the Z stage 213 has not moved forward by the distance beyond the necessary forward movement distance 1201 (STEP907/NO), the flow returns to STEP900.

The description will be provided with reference to FIG. 12 again.

An example in which the Z stage 213 (see FIG. 1) moves forward by a distance corresponding to one bendable portion 26 is illustrated in (e) in FIG. 12. At this time, since the forward movement has not reached the necessary forward movement distance 1201, the bendable portion 26S1 to the bendable portion 26S3 do not revert to the position control. On the other hand, since the control system in the bendable portion 26S4 is the position control, the attitude 703 stored in the attitude memory 19 is set as a target value. Since the leading portion pursuit control is enabled, the input selection unit 22 (see FIG. 5) is as follows in Table 5 below.

TABLE 5

| | State of selection switch 502 |
|---|---|
| Sec1 | Input apparatus |
| Sec2 | Attitude memory |
| Sec3 | Attitude memory |
| . . . | . . . |
| Sec9 | Attitude memory |

At this time, in the section Sec1, a target command from the input apparatus 10 is enabled, but since the control system in the corresponding bendable portion 26S1 is the back-drivable control, the target command is ignored. In the sections Sec2 and Sec3, a target command from the attitude memory 19 is enabled, but since the control system in the corresponding bendable portion 26S2 and the corresponding bendable portion 26S3 is similarly the back-drivable control, the target command is ignored.

Instead, since the control system in the three bendable portions counting from the distal end bendable portion is the back-drivable control, the attitude of the three bendable portions changes to such an attitude that a load is reduced due to the external force 702. This state is illustrated in FIG. 12 as if the attitude is becoming to be like the attitude stored in the attitude memory 19. Specifically, even when the Z stage 213 (see FIG. 1) is not caused to move forward from (e) in FIG. 12, since the attitude changes, a state like (f) in FIG. 12 is established. It is noted that the distal end bendable portion moves forward by the distance corresponding to one bendable portion between (d) in FIG. 12 and (e) in FIG. 12, and the attitude of the distal end bendable portion is stored in the attitude memory 19.

Due to the forward movement by the distance corresponding to the bendable portion, the attitude stored in the attitude memory 19 is an attitude 1203. In FIG. 12, the attitude 703 stored in the attitude memory 19 and the attitude 1203 are discontinuous. Therefore, a value of the attitude memory 19 needs to be updated before the bendable portion 26S4 under the position control enters the attitude 1203 stored in the attitude memory 19.

A state in which immediately before the bendable portion 26S4 enters the attitude 1203 stored in the attitude memory 19 and a forward movement distance 1202 is smaller than the necessary forward movement distance 1201 is illustrated in (g) in FIG. 12. When the forward movement further advances, the forward movement distance 1202 becomes larger than the necessary forward movement distance 1201 to update the attitude memory 19 (see FIG. 4), and all the attitude change units 27 (see FIG. 4) under the back-drivable control revert to the position control.

The description will be provided with reference to FIG. 9 again.

In STEP907, as described above, it is determined whether or not the Z stage 213 has moved forward beyond the necessary forward movement distance 1201. As a result of this determination, when the Z stage 213 has moved forward beyond the necessary forward movement distance 1201 (STEP907/YES), the flow proceeds to STEP908.

When the flow proceeds to STEP908, processing of recalculating the track to update the attitude memory 19 is performed in the control system of the continuum robot 100.

FIG. 13 illustrates the control system of the continuum robot 100 according to the first embodiment of the present invention, illustrating a configuration example for performing processing of recalculating the track to update the attitude memory 19. In FIG. 13, a component similar to the component illustrated in FIG. 4 to FIG. 6 is denoted by the same reference sign, and a detailed description thereof will not be repeated.

In the update of the attitude memory 19, first, the inverse kinematics calculation unit 24 converts the position command (RefPos) or the position (Pos) delivered from the position selection unit 30 into the bending angle 17 and the turning angle 18 of each of the bendable portions 26 (see FIG. 1). Next, in an interpolation unit 1301, such a procedure is performed that the bending angle 17 and the turning angle 18 are interpolated to be written to the attitude memory 19. Herein, when the control system of the attitude change unit 27 is the position control, the position selection unit 30 selects the position command (RefPos), and the control system is the back-drivable control, the position selection unit 30 selects the position (Pos). At this time, a reason why the position command (RefPos) is selected when the control system of the attitude change unit 27 is the position control is that the position command (RefPos) and the position (Pos) may deviate from each other by feedback control on Force. When the external force is large, by an action of a back-drivable control system of an inner loop, an equilibrium state may be established in a state in which a position error 1302 of position control of an outer loop remains. To maintain the position (Pos), the target position of the attitude change unit 27 needs to be the position command (RefPos). Therefore, the position selection unit 30 selects the position command (RefPos) when the control system in the attitude change unit 27 is the position control.

It is noted that when the external force is large, a state in which the position (Pos) does not match the position command (RefPos) and the attitude follows the external force to some extent helps protect the continuum robot 100 and an object in contact with the continuum robot 100.

On the other hand, when the control system of the attitude change unit 27 is the back-drivable control, Ksv=0, and the position command (RefPos) is ignored. Therefore, the position selection unit 30 selects the position (Pos) without the option of selecting the position command (RefPos).

In addition, the interpolation unit 1301 performs resample processing when the attitude memory 19 and the bendable portion 26 do not have a one-to-one relationship. In FIG. 13, the plurality of attitude memories 19 are allocated to the single bendable portion 26, and the smooth movement is carried out at the time of the forward movement of the Z stage 213 (see FIG. 1). For example, zero-order hold, linear interpolation, spline interpolation, or the like can be used as the resample processing.

The description will be provided with reference to FIG. 9 again.

In STEP908, when the track is recalculated to update the attitude memory 19, the flow proceeds to STEP909. When the flow proceeds to STEP909, the control switching unit 15 performs processing of switching the control system of all the bendable portions 26 to the position control. Specifically, the control switching unit 15 performs the switching from the back-drivable control to the position control by substituting a constant value for Ksv in the attitude change unit 27 (see FIG. 4). When this switching is completed, the processing in the flowchart of FIG. 8 is ended. The instance when the continuum robot 100 moves backward upon application of the present invention has been described above.

When the control system of some of the attitude change units 27 (see FIG. 4) is the back-drivable control, the control system can also be reverted to the position control by the operator at any timing. The operator can issue a command for reversion to the position control at any timing by a push button switch (not illustrated) or the like. Then, in FIG. 9, YES is determined in STEP900. The processing in STEP908 and STEP909 already described is performed, and the control system of all the attitude change units 27 reverts to the position control.

In the continuum robot 100 according to the above-described first embodiment, when forward movement or backward movement of the Z stage 213 (see FIG. 1) is detected after the look around operation, in a case where the attitude of the bendable portion 26 (first attitude) deviates from the attitude 703 of the bendable portion 26 (see FIG. 7: the second attitude) which is stored in the attitude memory 19 to a predetermined extent or beyond, the control switching unit 15 is configured to switch the control system from for the position control (first control) for the change into the specified attitude to the back-drivable control (second control) for changing the attitude following the external force as the change control of the attitude of the bendable portion 26 for at least one attitude change unit 27 (see FIG. 4).

In accordance with the above-described configuration, at the time of the forward movement or the backward movement after the look around operation by the continuum robot, it is possible to avoid the steep bending movement caused by the use of the attitude stored in the attitude memory 19 (see FIG. 4). Furthermore, it is possible to realize the continuum robot 100 which is easy to operate and which is capable of performing forward movement or backward movement in a state in which the external force is small while the steep bending movement is avoided at the time of the forward movement or the backward movement of the continuum robot.

In addition, with regard to all the bendable portions 26 positioned on the distal side in relation to the bendable portion 26 with the attitude deviated to the predetermined extent or beyond, by switching the control system of the attitude change unit 27 (see FIG. 4) to the back-drivable control (second control) for changing the attitude following the external force, portions under the position control are left unchanged, and forward movement or backward movement can be smoothly performed.

It is noted that an example is illustrated in which the forward and backward movement unit 14 (see FIG. 4) of the present embodiment is driven by the actuator 211 (see FIG. 1), but instead of using the actuator, a handle or the like can be used to manually drive the forward and backward movement unit 14. In the above-described case too, when the position detector 212 (see FIG. 1) is present, forward movement and backward movement can be detected, and the present invention can be adopted.

According to the present embodiment, the single bendable portion 26 is driven by the three wires 204 (see FIG. 1), but the number of wires is not limited to three. For example, when pushing and pulling are performed by a single wire, bending can still be carried out although a degree of freedom of bending is reduced from two degrees of freedom to one degree of freedom.

In the attitude change unit 27 (see FIG. 4), the gain Ksv is used for a position control unit, and the gain Kf is used for a back-drivable control unit, but the configuration is not limited to the gains. For example, Ksv can be changed to a component such as Cpos(s). For this Cpos(s), a combination of proportional-integral-derivative (PID) control and an infinite impulse response (IIR) filter or the like can be used. Similarly, Kf can also be changed to a component such as Cforce(s). When the position control is changed to the back-drivable control, a method of setting an output of Cpos(s) as 0 or the like is effective. In addition, when reversion to the position control from the back-drivable control is performed, an arrangement for clearing a state variable in Cpos(s) to 0 or the like is needed.

In addition, according to the present embodiment, the example has been illustrated in which the control switching unit 15 switches the control system from the position control to the back-drivable control by substituting 0 for Ksv in the attitude change unit 27 (see FIG. 4) from the constant value. However, by causing Ksv to continuously change according to an error, elapse of time, or the like, continuous transition from the position control to the back-drivable control can also be performed.

Similarly, according to the present embodiment, the example has been illustrated in which the control switching unit 15 switches the control system from the back-drivable control to the position control by substituting the constant value for Ksv in the attitude change unit 27 (see FIG. 4) from 0, but it is also possible to cause Ksv to continuously change according to an error, elapse of time, or the like. In this case, continuous transition from the back-drivable control to the position control can be performed.

Second Embodiment

Next, a second embodiment of the present invention will be described. It is noted that in an explanation of the second embodiment described below, a description on a matter common to the above-described first embodiment will not be repeated, and a matter different from the above-described first embodiment will be described.

FIG. 14 illustrates an example of a schematic configuration of the attitude change unit 27 in the continuum robot 100 according to the second embodiment of the present invention. In FIG. 14, a component similar to the component illustrated in FIG. 4 to FIG. 6 and FIG. 13 is denoted by the same reference sign, and a detailed description thereof will not be repeated.

The second embodiment is different from the first embodiment in a configuration in which, as illustrated in FIG. 14, the position control unit and the back-drivable control unit are arranged in parallel and switched by a switch 1401. The switch 1401 can perform the switching in response to the switching signal 35 from the control switching unit 15 (see FIG. 4). In the case of the configuration illustrated in FIG. 14, since the position command (RefPos) and the position (Pos) do not deviate from each other, the position selection unit 30 can be omitted. In this case, the position (Pos) is set as an input of the inverse kinematics calculation unit 24.

According to the second embodiment, in addition to the advantage of the above-described first embodiment, precise pursuit to the position command (RefPos) can be expected at the time of the position control.

Third Embodiment

Next, a third embodiment of the present invention will be described. It is noted that in an explanation of the third embodiment described below, a description on a matter common to the above-described first and second embodiments will not be repeated, and a matter different from the above-described first and second embodiments will be described.

The third embodiment is different from the first embodiment in a mode in which without performing the leading portion pursuit control, a track is planned in advance to store the planned track in the attitude memory 19, and the continuum robot 100 is controlled to the attitude corresponding to the position (PosZ) of the Z stage 213.

Figure 15A:
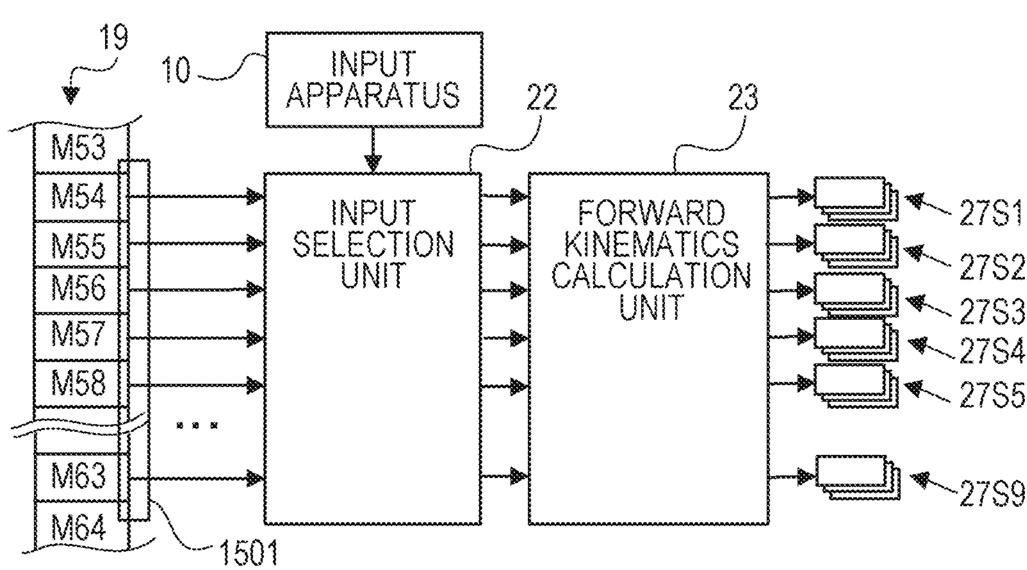
FIG. 15A illustrates an example of the schematic configuration of the attitude change unit of the continuum robot according to a third embodiment of the present invention.
Figure 15B:
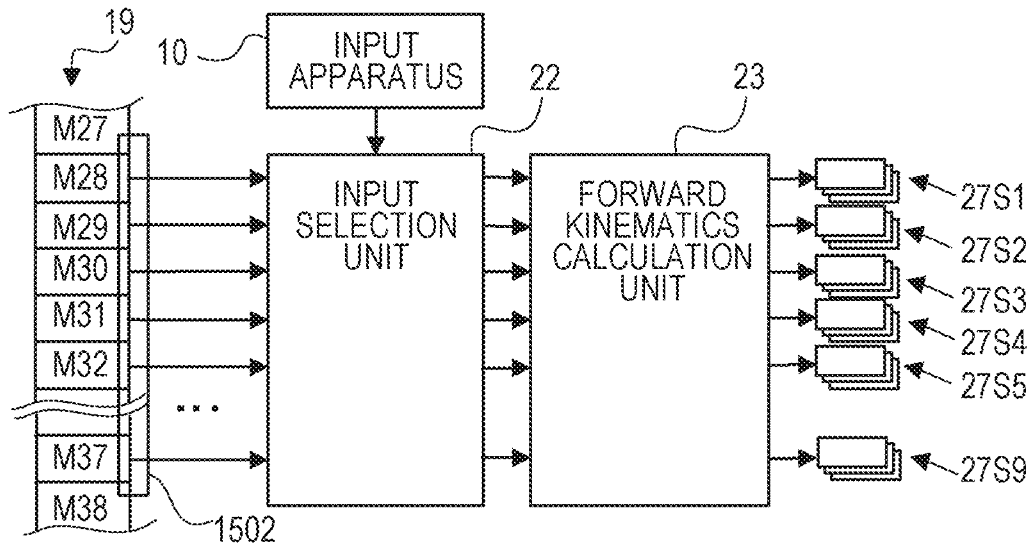
FIG. 15B illustrates an example of the schematic configuration of the attitude change unit of the continuum robot according to the third embodiment of the present invention.

FIG. 15A and FIG. 15B illustrate an example of the schematic configuration of the attitude change unit 27 of the continuum robot 100 according to the third embodiment of the present invention. Specifically, FIG. 15A and FIG. 15B are explanatory diagrams for describing an example of supplying the target value to the attitude change unit 27. In FIG. 15A and FIG. 15B, a component similar to the component illustrated in FIG. 4 to FIG. 6 and FIG. 13 is denoted by the same reference sign, and a detailed description thereof will not be repeated.

A tracking plan is drafted from drawing information, magnetic resonance imaging (MRI) scanning, computed tomography (CT) scanning, similar information, and the like, and this tracking plan is written to the attitude memory 19 as the attitude related to the bending target angle and the turning target angle. The attitude memory 19 of the present embodiment is associated with the position of the Z stage 213 (FIG. 1). Regardless of forward movement or backward movement, the input selection unit 22 (see FIG. 5) is set to select all the attitude memories 19 as illustrated in Table 6 below.

TABLE 6

| | State of selection switch 502 |
|---|---|
| Sec1 | Attitude memory |
| Sec2 | Attitude memory |
| Sec3 | Attitude memory |
| . . . | . . . |
| Sec9 | Attitude memory |

In FIG. 15A, a current reference state of the attitude memory 19 is assumed as a reference state 1501. In the reference state 1501, the addresses M54 to M63 are allocated as the attitude memory 19 corresponding to the bendable portion 26S1 to the bendable portion 26S9. From this state, when the Z stage 213 (see FIG. 1) moves forward, reference addresses of the attitude memory 19 need to be changed.

FIG. 15B illustrates a reference state of the attitude memories 19 in which the Z stage 213 moves forward to some extent. As a result of changing the reference addresses of the attitude memory 19 according to the forward movement of the Z stage 213, for example, a reference state 1502 is established. In this manner, by changing the addresses referred to by the attitude memory 19, the movement along the preplanned track can be performed. Since the leading portion pursuit control is not performed, unlike the first embodiment, write of the bending angle 17S1 (see FIG. 4) and the turning angle 18S1 (see FIG. 4) to the attitude memory 19 (see FIG. 4) is not performed. Control at and after the look around operation is the same as that of the first embodiment.

It is noted that according to the first embodiment, an increase in resolution of the attitude memory 19 which is illustrated in FIG. 6 can be applied to the present embodiment too. In addition, the second embodiment can be applied to the present embodiment.

According to the third embodiment, in addition to the advantage of the above-described first embodiment, the operation of the distal end bendable portion which is performed by the leading portion pursuit control becomes unnecessary, so that the operation becomes easier. When necessary, the input selection unit 22 (see FIG. 5) can be switched to accept an input from the input apparatus 10 (see FIG. 5).

Fourth Embodiment

Next, a fourth embodiment of the present invention will be described. It is noted that in an explanation of the fourth embodiment described below, a description on a matter common to the above-described first to third embodiments will not be repeated, and a matter different from the above-described first to third embodiments will be described.

The fourth embodiment is a mode different from the first embodiment in that the continuum robot 100 is controlled by using a linear motor without using a ball screw.

Figure 16:
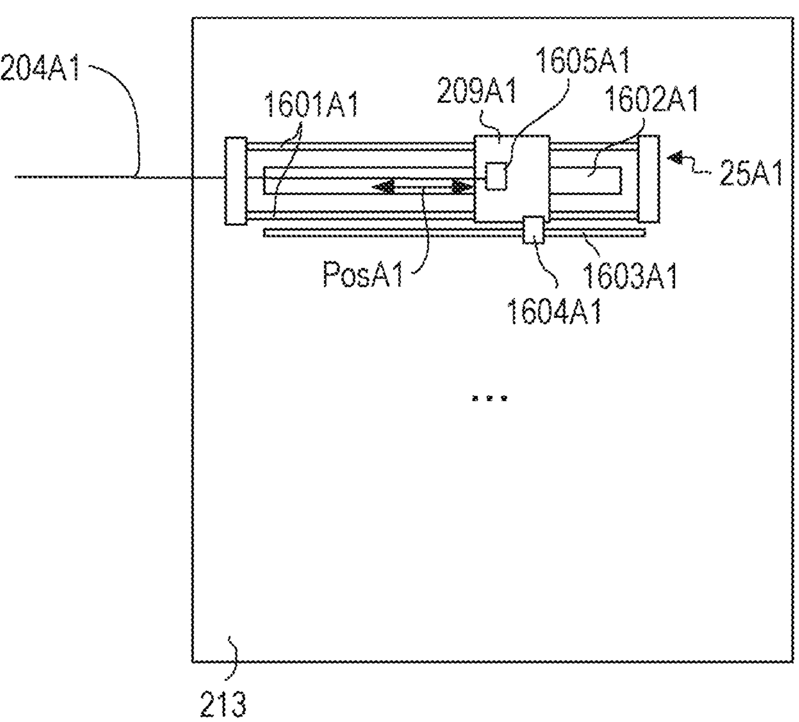
FIG. 16 illustrates an example of a schematic configuration in a wire drive unit of the continuum robot according to a fourth embodiment of the present invention.

FIG. 16 illustrates an example of a schematic configuration in the wire drive unit 25 in the continuum robot 100 according to the fourth embodiment of the present invention. In FIG. 16, a component similar to the component illustrated in FIG. 1 is denoted by the same reference sign, and a detailed description thereof will not be repeated.

The wire drive unit 25 according to the fourth embodiment includes a linear guide 1601 and a linear motor 1602 as illustrated in FIG. 16. In addition, the wire drive unit 25 according to the fourth embodiment includes a scale 1603 and a scale head 1604 for position detection as illustrated in FIG. 16. At this time, any scale such as an optical scale or a magnetic scale can be used as the scale 1603. In addition, the wire drive unit 25 according to the fourth embodiment is different from that of the first embodiment in that the tension sensor 207 is omitted, and the wire 204 can be directly fixed to the stage 209 via a wire clamp portion 1605. A reason why the tension sensor 207 (see FIG. 1) can be omitted in the wire drive unit 25 according to the fourth embodiment is that as compared with ball screw drive, linear motor drive has smaller friction and higher back-drivability.

Figure 17:
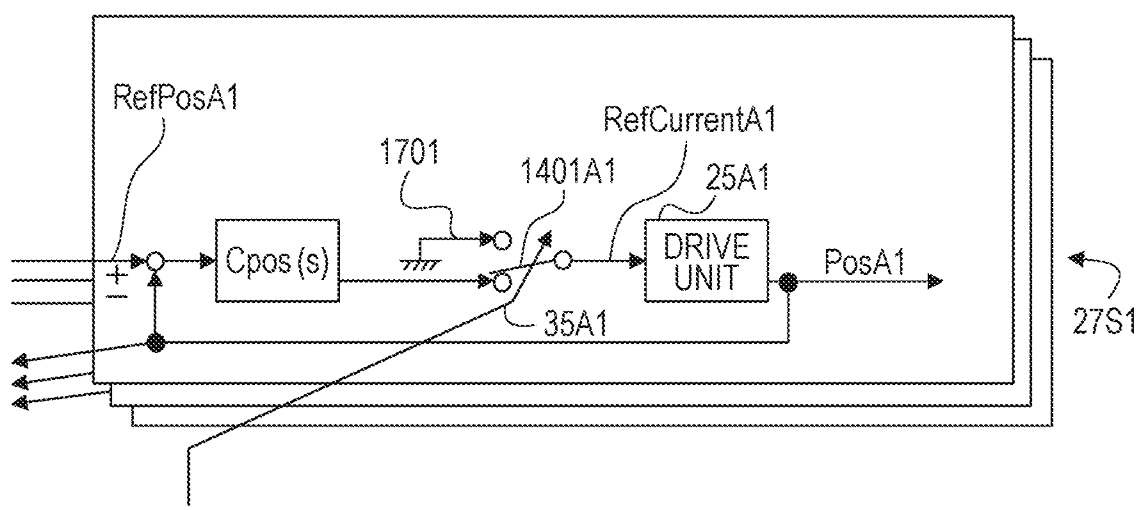
FIG. 17 illustrates an example of the schematic configuration of the attitude change unit of the continuum robot according to the fourth embodiment of the present invention.

FIG. 17 illustrates an example of the schematic configuration of the attitude change unit 27 of the continuum robot 100 according to the fourth embodiment of the present invention. In FIG. 17, a component similar to the component illustrated in FIG. 4, FIG. 13, and FIG. 14 is denoted by the same reference sign, and a detailed description thereof will not be repeated.

The attitude change unit 27 according to the fourth embodiment is different from the second embodiment in that, as illustrated in FIG. 17, the compensator Cforce(s) (see FIG. 14) for the back-drivable control is omitted. In the attitude change unit 27 according to the fourth embodiment, the switching from the position control to the back-drivable control is performed by the switch 1401. In the attitude change unit 27 according to the fourth embodiment, upon switching to the back-drivable control, a signal 1701 is selected, and the current command (RefCurrentA1) becomes 0. With this configuration, the stage 209 can move freely following the external force. In addition, in the attitude change unit 27 according to the fourth embodiment, power distribution to the linear motor may be directly cut off by the switch 1401 to cut off motive energy of the linear motor. It is noted that the switching of the switch 1401 can be performed in response to the switching signal 35 from the control switching unit 15 (see FIG. 4).

According to the fourth embodiment, in addition to the advantage of the above-described first embodiment, the tension sensor 207 can be omitted, and a simpler configuration can be obtained. It is noted that in the case of the linear motor drive, the tension sensor 207 does not necessarily need to be omitted, and the configuration may be freely combined with other embodiments.

Other Embodiments

The present invention can also be realized by processing in a manner that a program for realizing one or more functions of the above-described embodiments is supplied to a system or an apparatus via a network or a storage medium, and one or more processors in a computer in the system or the apparatus read out and execute the program. In addition, the present invention can also be realized by a circuit (for example, an application specific integrated circuit (ASIC)) which realizes one or more functions.

This program and a computer-readable storage medium storing the program are included in the present invention.

According to the aspect of the present invention, it is possible to realize the continuum robot which is easy to operate and which is capable of performing the forward movement or the backward movement in a state in which the external force is small while the steep bending movement is avoided at the time of the forward movement or the backward movement of the continuum robot.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A continuum robot comprising:

a plurality of bendable portions which are provided in series in a lengthwise direction and each of which is bendable;

at least one processor that executes instructions to:

cause the plurality of bendable portions to perform forward movement or backward movement in the lengthwise direction, and cause each of the bendable portions in the plurality of bendable portions to bend to change an attitude of the bendable portion; and at least one memory configured to store the attitude with regard to each of the bendable portions in the plurality of bendable portions, wherein the at least one processor is further configured to perform, when the forward movement or the backward movement is detected, in a case where a first attitude that is an attitude of at least one bendable portion in the plurality of bendable portions deviates to a predetermined extent or more from a second attitude that is an attitude of the at least one bendable portion which is stored in the at least one memory, switching or continuous transition from first control for changing the attitude into a specified attitude to second control for changing the attitude following an external force, and wherein the at least one processor is further configured to apply, as a condition for reversion from the second control to the first control, the backward movement of positions of the plurality of bendable portions that is performed since the switching or continuous transition from the first control to the second control and a situation where a deviation between the first attitude and the second attitude is equal to or lower than a threshold in a bendable portion positioned on a most proximal side out of at least one bendable portion in which the second control is executed.

2. The continuum robot according to claim 1, wherein the at least one memory stores, as the second attitude, an attitude of a bendable portion on a distal end in the plurality of bendable portions at a time when the forward movement is caused by the at least one processor, and the attitude of the bendable portion on the distal end which is stored in the at least one memory is an attitude used to perform leading portion pursuit control on a succeeding bendable portion subsequent to the bendable portion on the distal end each time the forward movement is performed.

3. The continuum robot according to claim 1, wherein the at least one memory stores, as the second attitude, the attitude of the at least one bendable portion for realizing a preplanned track based on at least one of drawing information, magnetic resonance imaging scanning, and computed tomography scanning.

4. The continuum robot according to claim 1, wherein the first attitude includes a bending angle and a turning angle of the at least one bendable portion which are obtained by using inverse kinematics based on a displacement position or a rotation amount of an actuator.

5. The continuum robot according to claim 1, wherein when the forward movement or the backward movement is detected, the at least one processor performs the switching or continuous transition from the first control to the second control with regard to all bendable portions positioned on a distal side in relation to the bendable portion in which the first attitude deviates from the second attitude to the predetermined extent or more.

6. The continuum robot according to claim 1, wherein the at least one processor further applies, as the condition for reversion from the second control to the first control, reception of a command for reversion to the first control.

7. A continuum robot comprising:

a plurality of bendable portions which are provided in series in a lengthwise direction and each of which is bendable;

at least one processor that executes instructions to:

cause the plurality of bendable portions to perform forward movement or backward movement in the lengthwise direction, and cause each of the bendable portions in the plurality of bendable portions to bend to change an attitude of the bendable portion; and at least one memory configured to store the attitude with regard to each of the bendable portions in the plurality of bendable portions, wherein the at least one processor is further configured to perform, when the forward movement or the backward movement is caused, in a case where a first attitude that is an attitude of at least one bendable portion in the plurality of bendable portions deviates to a predetermined extent or more from a second attitude that is an attitude of the at least one bendable portion which is stored in the at least one memory, switching or continuous transition from first control for changing the attitude into a specified attitude to second control for changing the attitude following an external force, and wherein the at least one processor further applies, as a condition for reversion from the second control to the first control, a situation where the forward movement of positions of the plurality of bendable portions is performed by a predetermined distance or the backward movement of positions of the plurality of bendable portions is performed by a predetermined distance since the switching or continuous transition from the first control to the second control.

8. The continuum robot according to claim 1, wherein the at least one processor is further configured to change the attitude of the bendable portion by driving a wire and includes or is in communication with a linear motor arranged to drive the wire.

9. The continuum robot according to claim 8, wherein in the second control, a current command of the linear motor is set as 0, or motive energy of the linear motor is cut off.

10. A control method for a continuum robot including a plurality of bendable portions which are provided in series in a lengthwise direction and each of which is bendable, at least one processor that executes instructions to (1) cause the plurality of bendable portions to perform forward movement or backward movement in the lengthwise direction, and (2) cause each of the bendable portions in the plurality of bendable portions to bend to change an attitude of the bendable portion, and at least one memory configured to store the attitude with regard to each of the bendable portions in the plurality of bendable portions, the control method comprising:

performing, when the forward movement or the backward movement is detected, in a case where a first attitude that is an attitude of at least one bendable portion in the plurality of bendable portions deviates to a predetermined extent or more from a second attitude that is an attitude of the at least one bendable portion which is stored in the at least one memory, switching or continuous transition from first control for changing the attitude into a specified attitude to second control for changing the attitude following an external force, and then performing switching or continuous transition from the second control to the first control, when (1) the backward movement of positions of the plurality of bendable portions is performed since the switching or continuous transition from the first control to the second control and (2) a situation where a deviation between the first attitude and the second attitude is equal to or lower than a threshold in a bendable portion positioned on a most proximal side out of at least one bendable portion in which the second control is executed is met.

11. A non-transitory recording medium having recorded thereon a program for causing a computer to execute the control method for the continuum robot according to claim 10.

* * * * *